(12) United States Patent
Ryu et al.

(10) Patent No.: US 11,388,678 B2
(45) Date of Patent: Jul. 12, 2022

(54) METHOD AND APPARATUS FOR CONTROLLING TRANSMISSION POWER IN WIRELESS COMMUNICATION SYSTEM

(71) Applicant: Samsung Electronics Co., Ltd., Suwon-si (KR)

(72) Inventors: Hyunseok Ryu, Suwon-si (KR); Jeongho Yeo, Suwon-si (KR); Jinyoung Oh, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 16/915,169

(22) Filed: Jun. 29, 2020

(65) Prior Publication Data
US 2020/0413348 A1    Dec. 31, 2020

(30) Foreign Application Priority Data

Jun. 28, 2019 (KR) ........................ 10-2019-0078300

(51) Int. Cl.
*H04W 52/24* (2009.01)
*H04W 4/40* (2018.01)
(Continued)

(52) U.S. Cl.
CPC ........... *H04W 52/241* (2013.01); *H04W 4/40* (2018.02); *H04W 52/242* (2013.01);
(Continued)

(58) Field of Classification Search
CPC ... H04W 52/241; H04W 4/40; H04W 52/343; H04W 52/367; H04W 52/242; H04W 92/18
See application file for complete search history.

(56) References Cited

U.S. PATENT DOCUMENTS 10,244,482 B2    3/2019  Chae
2015/0327180 A1*  11/2015  Ryu ..................... H04W 52/18
                                                  370/329
(Continued)

FOREIGN PATENT DOCUMENTS

EP    3 861 803    8/2021
EP    3 895 335   10/2021
(Continued)

OTHER PUBLICATIONS

Samsung, 'On Sidelink Power Control', R1-1906950, 3GPP TSG RAN WG1 #97, Reno, USA, May 3, 2019 pp. 1-8 and figure 1.
(Continued)

*Primary Examiner* — Brenda H Pham
(74) *Attorney, Agent, or Firm* — Jefferson IP Law, LLP

(57) ABSTRACT

A method and apparatus are provided. The method of configuring a sidelink transmission power by a V2X user equipment (UE) in a wireless communication system includes receiving, from a base station (BS), first parameter for sidelink link quality or second parameter for downlink link quality, configuring, the transmission power for at least one of a sidelink control channel or a sidelink data channel based on sidelink pathloss or downlink pathloss according to the receiving of the first parameter or the second parameter, and transmitting, to a receiving V2X UE, the sidelink control channel or the sidelink data channel based on the configured transmission power.

20 Claims, 18 Drawing Sheets

(51) Int. Cl.
*H04W 52/34* (2009.01)
*H04W 52/36* (2009.01)
*H04W 92/18* (2009.01)

(52) U.S. Cl.
CPC ....... *H04W 52/343* (2013.01); *H04W 52/367* (2013.01); *H04W 92/18* (2013.01)

(56) References Cited

U.S. PATENT DOCUMENTS

| | | | | |
|---|---|---|---|---|
| 2015/0327183 | A1* | 11/2015 | Park | H04W 8/005 370/311 |
| 2015/0373730 | A1* | 12/2015 | Fujishiro | H04L 1/0025 455/450 |
| 2016/0262111 | A1* | 9/2016 | Boudreau | H04W 76/10 |
| 2018/0199346 | A1* | 7/2018 | Hou | H04W 72/0473 |

FOREIGN PATENT DOCUMENTS

| | | |
|---|---|---|
| WO | 2017034258 A1 | 3/2017 |
| WO | 2020/096693 A1 | 5/2020 |
| WO | 2020/126114 A1 | 6/2020 |

OTHER PUBLICATIONS

Convida Wireless, 'Discussion on Sidelink Procedures', R1-1903153, 3GPP, TSG RAN WG1 #96, Athens, Greece, Feb. 16, 2019, pp. 1-3.
Ericsson, 'Remaining details on PHY procedures for Rel. 16 NR V2X', R1-1903164, 3GPP TSG RAN WG1 #96, Athens, Greece, Feb. 15, 2019, pp. 1-12.
Huawei et al., 'Power control and power sharing for V2X sidelink', R1-1903074, 3GPP TSG RAN WG1 #96, Athens, Greece, Feb. 15, 2019, pp. 1-4.
International Search Report dated Sep. 24, 2020, issued in International Application No. PCT/KR2020/008480.
Huawei et al: "Power control and power sharing for V2X sidelink", R1-1906598 (May 13, 2019), XP051728049.
European Search Report dated Feb. 14, 2022, issued in European Application No. 20832282.6.

* cited by examiner

IN-COVERAGE SCENARIO

PARTIAL COVERAGE SCENARIO

OUT-OF-COVERAGE SCENARIO

INTER-CELL V2X COMMUNICATION SCENARIO

GROUPCAST V2X COMMUNICATION

IN CASE OF EXISTENCE OF PSFCH

IN CASE OF ABSENCE OF PSFCH

METHOD AND APPARATUS FOR CONTROLLING TRANSMISSION POWER IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0078300, filed on Jun. 28, 2019, in the Korean Intellectual Property Office, the disclosure of which is incorporated by reference herein in its entirety.

BACKGROUND

1. Field

The disclosure relates to a method and apparatus for controlling a transmission power of a sidelink for transmitting feedback information, control information, and data information between terminals. More particularly, the disclosure relates to a method and apparatus for controlling the transmission power of the sidelink by estimating pathloss using a signal, transmitted to the sidelink, for pathloss estimation.

The disclosure also relates to a method and apparatus for controlling the transmission power of the sidelink by estimating a distance between terminals using location information of the terminals.

2. Description of Related Art

To meet the soaring demand with respect to wireless data traffic because of the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-Long Term Evolution (LTE) systems. The 5G communication system prescribed in the $3^{rd}$ Generation Partnership Project (3GPP) is called a new radio (NR) system. To achieve higher data transmission rates, implementation of developing communication systems in ultra-high frequency bands millimeter wave (mmWave), such as, e.g., 60 GHz, is being considered. In 5G communication systems, beamforming, massive multi-input multi-output (MIMO), full dimensional MIMO (FD-MIMO), an array antenna, analog beamforming, and large-scale antenna technologies have been discussed as ways of alleviating propagation pathloss of radio waves and increasing propagation distances of radio waves in ultra-high frequency bands, and have also been applied to NR systems. For system network improvement, in 5G communication systems, technologies such as evolved small cell, advanced small cell, cloud radio access network (RAN), ultra-dense network, device-to-device (D2D) communication, wireless backhaul, moving network, cooperative communication, coordinated multi-points (CoMPs), and interference cancellation have been developed. In a 5G system, Advanced Coding Modulation (ACM) schemes including hybrid Frequency-Shift Keying (FSK) and Quadrature Amplitude Modulation (QAM) Modulation (FQAM) and Sliding Window Superposition Coding (SWSC), and advanced access schemes including Filter Bank Multi Carrier (FBMC), Non-Orthogonal Multiple Access (NOMA), and Sparse Code Multiple Access (SCMA) have been developed.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched. Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Thus, various attempts have been made to apply 5G communication systems to IoT networks. For example, 5G communication, such as sensor networks, M2M, MTC, etc., has been implemented by a scheme such as beamforming, MIMO, an array antenna, and so forth. The application of cloud RAN as a Big Data processing technology may also be an example of the convergence of 5G technology and IoT technology.

For vehicle communication, based on a D2D communication architecture, vehicle-to-everything (V2X) based on an LTE system has been standardized in 3GPP Rel-14 and Rel-15. Currently, effort is being made to develop V2X based on a 5G or NR system. 5G or NR-based V2X, unicast communication may support groupcast (or multicast) communication, broadcast communication, etc., between terminals. 5G or NR-based V2X also aims at providing more advanced services such as platooning, advanced driving, an extended sensor, a remote driving, etc., unlike LTE-based V2X aiming at transmitting and receiving basic safety information required for on-road driving of vehicles. Such various services and scenarios require higher reliability and higher data rate than in LTE-based D2D or LTE-based V2X. Thus, 5G or NR-based V2X needs to support link adaptation based on measurement of a quality of a sidelink between terminals.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for estimating pathloss of a sidelink between terminals to support high reliability and high data rate.

Another aspect of the disclosure is to provide a method and apparatus for controlling a transmission power of a sidelink between terminals based on pathloss estimation.

Another aspect of the disclosure is to provide a method and apparatus for controlling a transmission power of a sidelink between terminals based on location information.

Additional aspects will be set forth in part in the description which follows and, in part, will be apparent from the description, or may be learned by practice of the presented embodiments.

In accordance with an aspect of the disclosure, a method of configuring a sidelink transmission power by a V2X user equipment (UE) in a wireless communication system is provided. The method includes receiving, from a base station (BS), a first parameter for sidelink link quality or second parameter for downlink link quality, configuring a transmission power for at least one of a sidelink control channel or a sidelink data channel based on a sidelink pathloss or a downlink pathloss according to the receiving of the first parameter or the second parameter, and transmitting, to a receiving V2X UE, the sidelink control channel or the sidelink data channel based on the configured transmission power.

The configuring of the transmission power may include configuring a first data channel transmission power based on a maximum transmission power of the V2X UE, a transmission power based on the sidelink pathloss and a transmission power based on the downlink pathloss, when the transmission power for the sidelink data channel is configured.

The configuring of the transmission power may include configuring a second data channel transmission power of the sidelink data channel of a multiplexed region based on a ratio between a first resource of the sidelink control channel and a second resource of the sidelink data channel in the multiplexed region and the first data channel transmission power, when the transmission power for the sidelink data channel of the multiplexed region is configured, wherein the multiplexed region comprises the sidelink control channel and the sidelink data channel.

The configuring of the transmission power may include configuring a transmission power of the sidelink control channel of a multiplexed region based on a ratio between a first resource of the sidelink control channel and a second resource of the sidelink data channel in the multiplexed region and the first data channel transmission power, when the transmission power for the sidelink data channel of the multiplexed region is configured, wherein the multiplexed region comprises the sidelink control channel and the sidelink data channel.

The transmission power based on the sidelink pathloss may be calculated based on the first parameter, a third parameter for compensating the sidelink pathloss, and a sidelink pathloss estimation.

Transmission power based on the downlink pathloss may be calculated based on the second parameter, a fourth parameter for compensating the downlink pathloss, and a downlink pathloss estimation.

The method may further include receiving, from the base station, a third parameter for compensating the sidelink pathloss or a fourth parameter for compensating the downlink pathloss.

The method may further include receiving, from the base station, information on a maximum transmission power which the V2X UE is usable according to a congestion level, and configuring a third data channel transmission power based on a maximum transmission power of the V2X UE, a transmission power based on the sidelink pathloss, a transmission power based on downlink pathloss and a maximum transmission power which the V2X UE is usable according to the congestion level, when the transmission power for the sidelink data channel is configured.

In accordance with another aspect of the disclosure, a method of configuring a sidelink transmission power by a V2X user equipment (UE) in a wireless communication system is provided. The method includes receiving, from a base station (BS), a parameter for downlink link quality and a parameter for compensating downlink pathloss, configuring a transmission power for a sidelink feedback channel based on the parameter for downlink link quality, the parameter for compensating downlink pathloss, and a downlink pathloss, and transmitting, to a receiving V2X UE, the sidelink feedback channel based on the configured transmission power.

The configuring of the transmission power may include configuring the transmission power with a predetermined value, when the downlink pathloss is not applicable.

In accordance with another aspect of the disclosure, a V2X user equipment (UE) configuring a sidelink transmission power in a wireless communication system is provided. The V2X UE includes a transceiver, and at least one processor configured to receive, from a base station (BS), first parameter for sidelink link quality or second parameter for downlink link quality, configure a transmission power for at least one of a sidelink control channel or a sidelink data channel based on a sidelink pathloss or a downlink pathloss according to the receiving of the first parameter or the second parameter, and transmit, to a receiving V2X UE, the sidelink control channel or the sidelink data channel based on the configured transmission power.

The at least one processor may be further configured to configure a first data channel transmission power based on a maximum transmission power of the V2X UE, a transmission power based on the sidelink pathloss and a transmission power based on the downlink pathloss, when the transmission power for the sidelink data channel is configured.

The at least one processor may be further configured to configure a second data channel transmission power of the sidelink data channel of a multiplexed region based on a ratio between a first resource of the sidelink control channel and a second resource of the sidelink data channel in the multiplexed region and the first data channel transmission power, when the transmission power for the sidelink data channel of the multiplexed region is configured, wherein the multiplexed region comprises the sidelink control channel and the sidelink data channel.

The at least one processor may be further configured to configure a transmission power of the sidelink control channel of a multiplexed region based on a ratio between a first resource of the sidelink control channel and a second resource of the sidelink data channel in the multiplexed region and the first data channel transmission power, when the transmission power for the sidelink data channel of the multiplexed region is configured, wherein the multiplexed region comprises the sidelink control channel and the sidelink data channel.

The transmission power based on the sidelink pathloss may be calculated based on the first parameter, a third parameter for compensating the sidelink pathloss, and a sidelink pathloss estimation.

The transmission power based on the downlink pathloss may be calculated based on the second parameter, a fourth parameter for compensating the downlink pathloss, and a downlink pathloss estimation.

The at least one processor may be further configured to receive, from the base station, a third parameter for compensating the sidelink pathloss or a fourth parameter for compensating the downlink pathloss.

The at least one processor may be further configured to receive, from the base station, information on a maximum transmission power which the V2X UE is usable according to a congestion level, and configure a third data channel transmission power based on a maximum transmission power of the V2X UE, a transmission power based on the sidelink pathloss, a transmission power based on downlink pathloss and a maximum transmission power which the V2X UE is usable according to the congestion level, when the transmission power for the sidelink data channel is configured.

In accordance with another aspect of the disclosure a V2X user equipment (UE) configuring a sidelink transmission power in a wireless communication system is provided. The V2X UE includes a transceiver, and at least one processor configured to receive, from a base station (BS), a parameter for downlink link quality and a parameter for compensating downlink pathloss, configure a transmission power for a sidelink feedback channel based on the parameter for downlink link quality, the parameter for compensating downlink pathloss, and a downlink pathloss, and transmit, to a receiving V2X UE, the sidelink feedback channel based on the configured transmission power.

The at least one processor may be further configured to configure the transmission power with a predetermined value, when the downlink pathloss is not applicable.

Moreover, a disclosed embodiment provides a method and apparatus for effectively providing a service in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
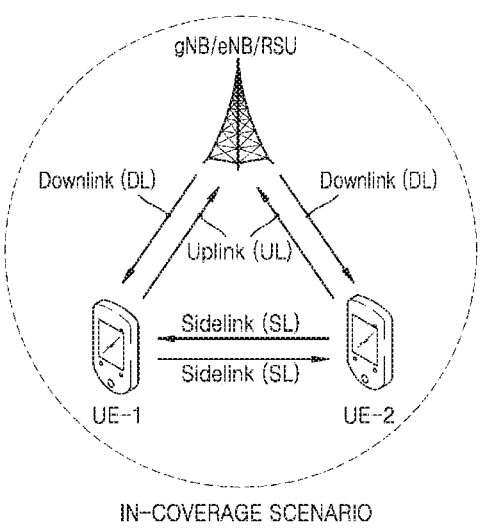
FIGS. 1A, 1B. 1C, and 1D are views for describing a vehicle-to-everything (V2X) system according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When embodiments of the disclosure are described, technical matters that are well known in a technical field of the disclosure and are not directly related to the disclosure will not be described. By omitting any unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the disclosed embodiments, but may be implemented in various ways, and the embodiments of the disclosure are provided to complete the disclosure and to allow those of ordinary skill in the art to understand the scope of the disclosure. The disclosure is defined by the category of the claims. Throughout the specification, an identical reference numeral will indicate an identical element.

Throughout the disclosure, the expression "at least one of a, b or c" indicates only a, only b, only c, both a and b, both a and c, both b and c, all of a, b, and c, or variations thereof.

A terminal may include a user equipment (UE), a mobile station (MS), a cellular phone, a smartphone, a computer, or a multimedia system capable of performing communication functions.

In the disclosure, a controller may be referred to as a processor.

In the disclosure, a layer (layer device) may be referred to as an entity.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment, the term '~unit', as used herein, denotes a software or hardware component, such as a Field Programmable Gate Array (FPGA) or Application Specific Integrated Circuit (ASIC), which performs certain tasks. However, the meaning of '~unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card. In the embodiments of the disclosure, '~unit' may include one or more processors.

As used in the following description, a term for identifying an access node, terms referring to network entities, terms referring to messages, a term referring to an interface between network objects, and terms referring to various identification information are illustrated for convenience of explanation. Therefore, the disclosure is not limited by the following terms, and other terms referring to objects having equivalent technical meanings may be used.

In the disclosure, for convenience of description, the disclosure uses terms and names defined in standards regarding $5^{th}$-Generation (5G), New Radio (NR), or Long Term Evolution (LTE) systems. However, the disclosure is not limited by such terms and names, and may be equally applied to systems complying with other standards.

While a description will be focused on a communication standard specified by the 3GPP, when embodiments of the disclosure are described in detail, a main subject matter to be claimed in the specification is also applicable to other communication systems and services having a similar technical background without significantly departing from a range disclosed herein, as will be obvious to those of ordinary skill in the art.

In the disclosure, a transmission UE may mean a UE that transmits a signal for pathloss estimation or a pathloss estimation signal, a UE that transmits sidelink data and control information, or a UE that receives sidelink feedback information. In the disclosure, a reception UE may mean a UE that receives the pathloss estimation signal, a UE that receives sidelink data and control information, or a UE that transmits sidelink feedback information.

FIGS. 1A through 1D are views for describing a vehicle-to-everything (V2X) system according to various embodiments of the disclosure.

FIG. 1A shows an example in which all V2X UEs UE-1 and UE-2 are located in a coverage of a base station (gNB/eNB/RSU) (an in-coverage scenario). All the V2X UEs UE-1 and UE-2 may receive data and control information from the base station (gNB/eNB/RSU) through a downlink (DL) or transmit data and control information to the base station through an uplink (UL). The data and control information may be data and control information for V2X communication or data and control information for general cellular communication other than V2X communication. In FIG. 1A, the V2X UEs UE-1 and UE-2 may transmit and receive data and control information for V2X communication through a sidelink (SL).

Figure 1B:
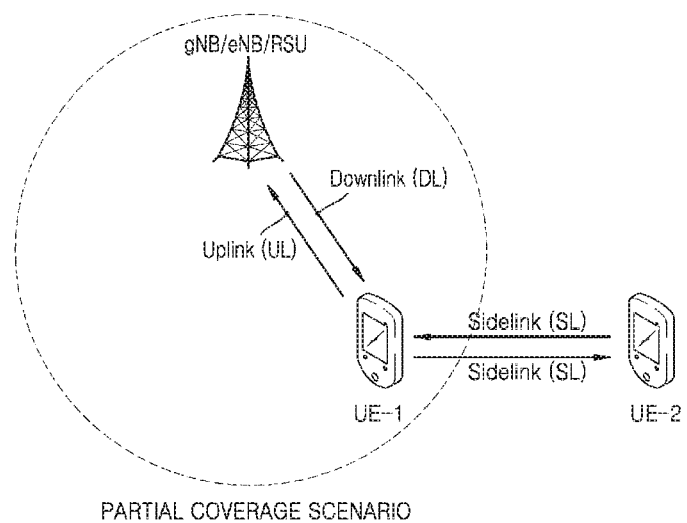

FIG. 1B shows an example in which the V2X UE UE-1 is located in the coverage of the base station (gNB/eNB/RSU) and the V2X UE UE-2 is located out of the coverage of the base station (gNB/eNB/RSU) (a partial coverage scenario). The V2X UE UE-1 located in the coverage of the base station (gNB/eNB/RSU) may receive data and control information from the base station (gNB/eNB/RSU) through the DL or transmit data and control information to the base station (gNB/eNB/RSU) through the UL. The V2X UE UE-2 located out of the coverage of the base station (gNB/eNB/RSU) may not receive data and control information from the base station (gNB/eNB/RSU) through the UL and transmit data and control information to the base station (gNB/eNB/RSU) through the UL. The V2X UE UE-2 may transmit and receive data and control information for V2X communication through an SL.

Figure 1C:
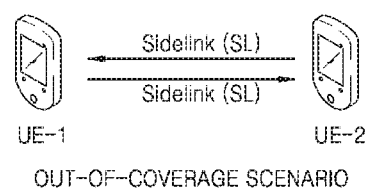

FIG. 1C shows an example in which all V2X UEs UE-1 and UE-2 are located out of the coverage of the base station (gNB/eNB/RSU) (an out-of-coverage scenario). Thus, the V2X UEs UE-1 and UE-2 may not receive data and control information from the base station (gNB/eNB/RSU) through the DL and transmit data and control information to the base station (gNB/eNB/RSU) through the UL. The V2X UEs UE-1 and UE-2 may transmit and receive data and control information for V2X communication through the SL.

Figure 1D:
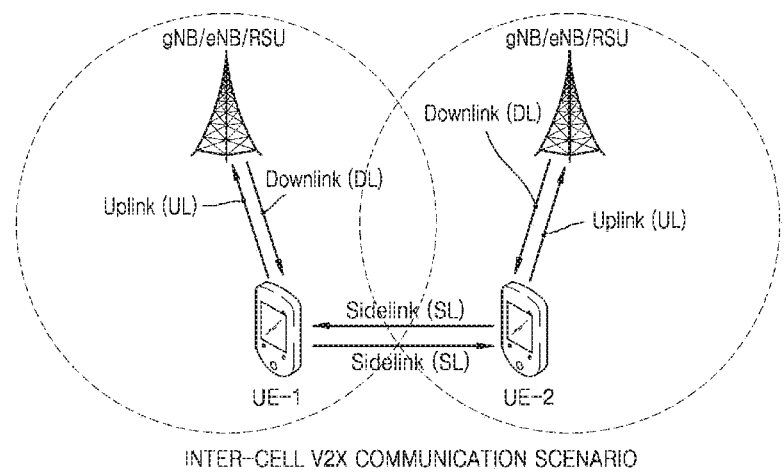

FIG. 1D shows an example in which a V2X transmission UE and a V2X reception UE are connected to different base stations (gNBs/eNBs/RSUs) (a radio resource control (RRC) connected state) or camped (an RRC-disconnected state, i.e., an RRC idle state) (inter-cell V2X communication). In this case, the V2X UE UE-1 may be a V2X transmission UE and the V2X UE UE-2 may be a V2X reception UE. Alternatively, the V2X UE UE-1 may be a V2X reception UE and the V2X UE UE-2 may be a V2X transmission UE. The V2X UE UE-1 may receive a V2X dedicated system information block (SIB) from a base station to which the V2X UE UE-1 is connected (or in which the V2X UE UE-1 is camped), and the V2X UE UE-2 may receive the V2X dedicated SIB from another base station to which the V2X UE UE-2 is connected (or in which the V2X UE UE-2 is camped). In this case, information of the V2X dedicated SIB received by the V2X UE UE-1 and information of the V2X dedicated SIB received by the V2X UE UE-2 may be different from each other. Thus, to perform V2X communication between UEs located in different cells, the information needs to be united.

While a description has been made with reference to FIGS. 1A through 1D by using a V2X system including two UEs UE-1 and UE-2 as an example for convenience, various numbers of UEs may join the V2X system without being limited to the description. The UL and the DL with the base station (eNB/gNB/RSU) and the V2X UEs UE-1 and UE-2 may be referred to as Uu interfaces, and the SL between the V2X UEs UE-1 and UE-2 may be referred to as a PC5 interface. Thus, in the disclosure, these terms may be used interchangeably.

Meanwhile, in the disclosure, a UE may refer to a vehicle supporting vehicular-to-vehicular (V2V) communication, a vehicle supporting vehicular-to-pedestrian (V2P) communication, a vehicle supporting vehicular-to-network (V2N) communication between a handset (e.g., a smartphone) of a pedestrian and a vehicle, a vehicle supporting vehicular-to-infrastructure (V2I) communication between a vehicle and an infrastructure. In the disclosure, the UE may also refer to a road side unit (RSU) having a UE function, an RSU having a base station function, an RSU having a part of the UE function and a part of the base station function.

Figure 2A:
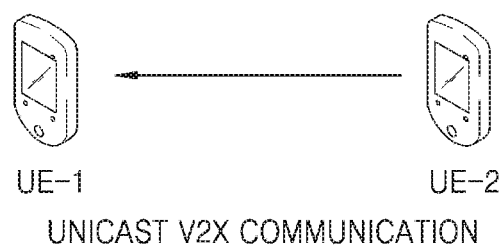
FIGS. 2A and 2B are views for describing a method for V2X communication made through a sidelink according to various embodiments of the disclosure.
Figure 2B:
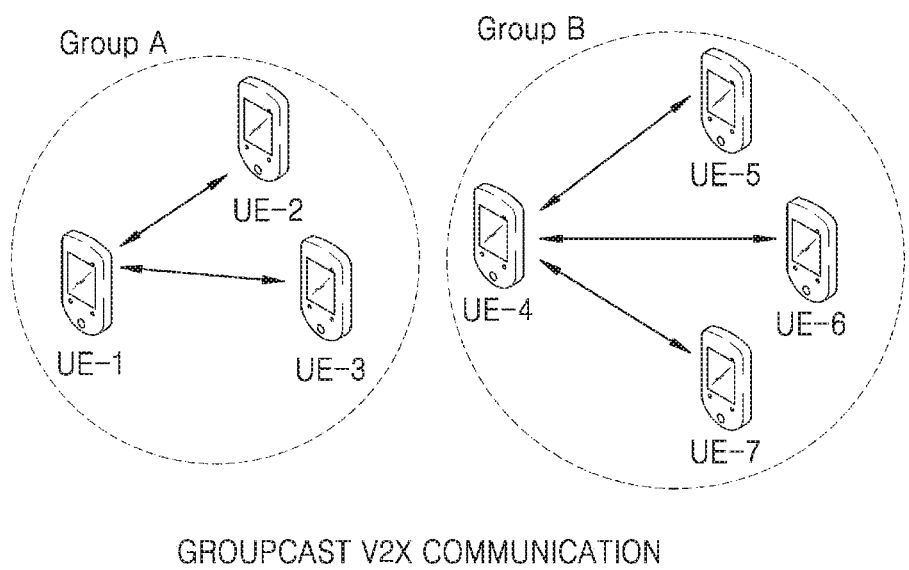

FIGS. 2A and 2B are views for describing a method for V2X communication made through a sidelink according to various embodiments of the disclosure.

Referring to FIG. 2A, a transmission UE and a reception UE may perform one-to-one communication, which may be referred to as unicast communication.

Referring to FIG. 2B, a transmission UE and a reception UE may perform one-to-many communication, which may be referred to as groupcast or multicast communication. It is illustrated in FIG. 2B that UE-1, UE-2, and UE-3 perform groupcast communication by forming one group (group A) and UE-4, UE-5, UE-6, and UE-7 perform groupcast communication by forming another group (group B). Each UE may perform groupcast communication only in a group to which the UE belongs, and may perform unicast, groupcast, or broadcast communication between different groups. Although it is illustrated in FIG. 2B that two groups are formed, a greater number of groups may be formed without being limited to the illustration.

Meanwhile, although not shown in FIGS. 2A and 2B, V2X UEs may perform broadcast communication. In broadcast communication, all V2X UEs receive data and control information transmitted by a V2X transmission UE through an SL. For example, when the V2X UE UE-1 is assumed to be a transmission UE for broadcasting in FIG. 2B, all UEs UE-2, UE-3, UE-4, UE-5, UE-6, and UE-7 may receive data and control information transmitted by the V2X UE UE-1.

A sidelink unicast, groupcast, or broadcast communication method according to an embodiment of the disclosure may be supported in the in-coverage scenario, the partial-coverage scenario, and the out-of-coverage scenario.

In an NR V2X system, unlike in the LTE V2X system, support for a transmission scheme in which a vehicle UE transmits data to one certain UE through unicast and a transmission scheme in which data is transmitted to multiple UEs through groupcast may be considered. For example, considering a service scenario such as platooning that connects two or more vehicles via one network and groups and moves them in a group, such unicast and groupcast may be usefully used. More specifically, unicast communication may be needed for a leader UE of a group connected through platooning to control one certain UE, and groupcast communication may be needed to simultaneously control a group including multiple certain UEs.

According to an embodiment of the disclosure, resource allocation in the V2X system may use the following methods:

(1) Mode 1 Resource Allocation

More 1 resource allocation may mean resource allocation scheduled by a base station. More specifically, in mode 1 resource allocation, a base station may allocate a resource used for SL transmission to RRC-connected UEs by using dedicated scheduling. Scheduled resource allocation may be effective for interference management and resource pool management (dynamic allocation and/or semi-persistent transmission) because the base station may manage a resource of an SL. When there is data to be transmitted to other UEs, an RRC-connected mode UE may transmit information notifying a base station of existence of the data to be transmitted to the other UEs, by using an RRC message or a medium access control (MAC) control element (CE). The RRC message may be, for example, a sidelink UE information message (SidelinkUEInformation) or a UE assistance information (UEAssistanceInformation) message, and the MAC CE may be a BSR MAC CE scheduling request (SR), etc., including at least one of an indicator indicating a buffer status report (BSR) for V2X communication or information about a size of data buffered for SL communication. Mode 1 resource allocation may be applied when a V2X transmission UE is in a coverage of the base station because an SL transmission UE is scheduled for a resource by the base station.

(2) Mode 2 Resource Allocation

In mode 2 resource allocation, an SL transmission UE may autonomously select a resource (UE autonomous resource selection). More specifically, in mode 2 resource allocation, a base station provides an SL transmission and reception resource pool for V2X to a UE through system information or an RRC message (e.g., an RRC reconfiguration message (RRCReconfiguration) or a PC5-RRC message) and a transmission UE selects a resource pool and a resource according to a determined rule. In an embodiment of the disclosure, a base station provides configuration information for an SL transmission and reception resource pool, such that mode 2 resource allocation may be applied to a case where a V2X transmission/reception UE is located in a coverage of the base station. When the V2X transmission/reception UE exists out of the coverage of the base station, the V2X transmission/reception UE may perform a mode 2 resource allocation operation in a preset transmission/reception resource pool. A UE autonomous resource selection method may include zone mapping, sensing-based resource selection, random selection, etc.

(3) Even when the UE exists in the coverage of the base station, resource allocation or resource selection may not be performed in the scheduled resource allocation or UE autonomous resource selection mode. In this case, the UE may perform V2X SL communication through a preconfigured SL transmission/reception resource pool.

Figure 3:
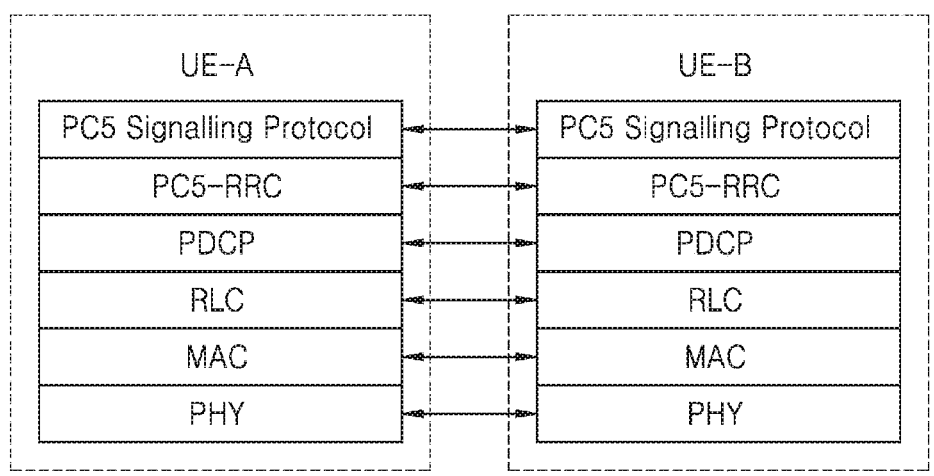
FIG. 3 is a view for describing a protocol of a V2X terminal according to an embodiment of the disclosure.

FIG. 3 is a view for describing a protocol of a V2X UE according to an embodiment of the disclosure.

Although not shown in FIG. 3, application layers between a UE-A and a UE-B may perform service discovery. In this case, service discovery may include discovery regarding a V2X communication scheme (unicast, groupcast, or broadcast communication) to be performed by each UE. Thus, in FIG. 3, it may be assumed that the UE-A and the UE-B recognize that unicast communication is to be performed through service discovery performed in the application layers. V2X UEs may obtain information about a source identifier (ID) and a destination ID for V2X communication in the foregoing service discovery.

Upon completion of service discovery, a PC5 signaling protocol layer shown in FIG. 3 may perform a UE-to-UE direct link connection setup procedure. In this case, security configuration information may be exchanged for UE-to-UE direct communication.

Upon completion of UE-to-UE direct link connection setup, a UE-to-UE PC5 RRC setup procedure may be performed in the PC5 RRC layer shown in FIG. 3. At this time, information about a capability of the UE-A and information about a capability of the UE-B may be exchanged, and access stratum (AS) layer parameter information for unicast communication may be exchanged.

Upon completion of the PC5 RRC setup procedure, the UE-A and the UE-B may perform unicast communication.

While the foregoing description has been made using unicast communication as an example, this may extend to groupcast communication. For example, when the UE-A, the UE-B, and a UE-C that is not shown in FIG. 3 perform groupcast communication, the UE-A and the UE-B may perform service discovery for unicast communication, UE-to-UE direct link setup, and PC5 RRC setup as described above. The UE-A and a UE-C may also perform service discovery for unicast communication, UE-to-UE direct link setup, and PC5 RRC setup. The UE-B and a UE-C may also perform service discovery for unicast communication, UE-to-UE direct link setup, and PC5 RRC setup. That is, a PC5 RRC setup procedure for unicast communication, instead of a separate PC5 RRC setup procedure for groupcast communication, may be performed in a pair of a transmission UE and a reception UE that join groupcast communication.

Figure 4:
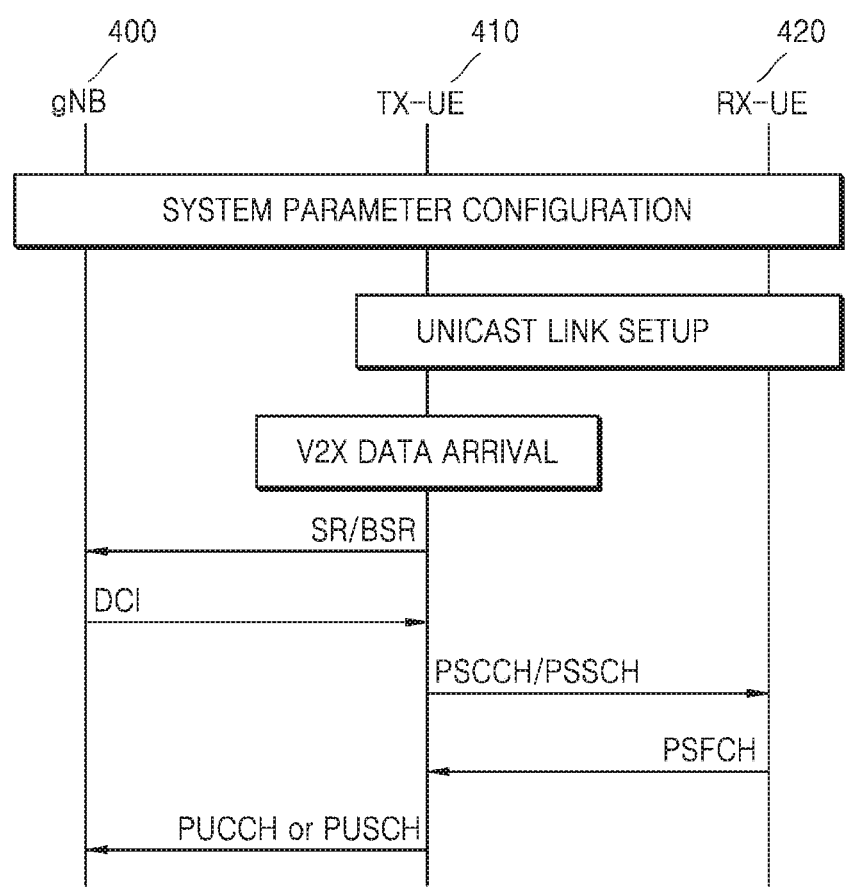
FIG. 4 is a view for describing a V2X unicast communication procedure, according to an embodiment of the disclosure.

FIG. 4 is a view for describing a V2X unicast communication procedure, according to an embodiment of the disclosure.

More specifically, FIG. 4 is a view for describing a V2X communication procedure based on mode 1 resource allocation described with reference to FIGS. 2A and 2B. In FIG. 4, a base station 400 (eNB/gNB/RSU) may configure a parameter for V2X communication for a transmission UE 410 and a reception UE 420 in a cell through system information. For example, the base station 400 may configure information about a resource pool in which V2X communication is possible in a cell of the base station 400. In this case, the resource pool may indicate a transmission resource pool for V2X transmission or a reception resource pool for V2X reception. For a V2X UE, information about one or more resource pools may be configured by the base station 400. The base station 400 may configure unicast communication, groupcast communication, and broadcast communication to be performed in different resource pools through the system information. For example, a resource pool 1 may be used in unicast communication, a resource pool 2 may be used in groupcast, and a resource pool 3 may be used in broadcast communication. In another example, the base station 400 may configure unicast communication, groupcast communication, and broadcast communication to be performed in the same resource pool. In another example, the base station 400 may configure different resource pools based on whether a resource of a physical sidelink feedback channel (PSFCH) for transmitting SL feedback information exists in a resource pool. More specifically, the PSFCH resource may exist in the resource pool 1 and may not exist in the resource pool 2. In this case, SL unicast and groupcast data that require hybrid automatic repeat and request (HARQ) feedback may use the resource pool 1, and SL unicast and groupcast data and broadcast data that do not require HARQ feedback may use the resource pool 2.

Resource pool information configured by the base station 400 may include at least one of the following information:

1. Information about a time resource of a resource pool: this information may include an index of a slot in which a physical sidelink control channel (PSCCH), a physical sidelink shared channel (PSSCH), and a physical sidelink feedback channel (PSFCH) are to be transmitted or the index of the slot in which the PSCCH, the PSSCH, and the PSFCH are to be transmitted and a symbol index in the corresponding slot. The information may also include a period of a resource in which the PSCCH, the PSSCH, and the PSFCH are transmitted.

2. Information about a frequency resource of a resource pool: this information may mean information about a frequency axis in a resource pool in which the PSCCH, the PSSCH, and the PSFCH may be transmitted, and more specifically, may include an index of a resource block constituting the resource pool or an index of a sub-channel including two or more resource blocks.

3. Information about whether SL HARQ-acknowledgement (ACK) is used may be included in resource pool configuration information.

(1) When SL HARQ-ACK is used, the information may include at least one of the following information:

(1-1) Maximum Retransmission Count (1-2) HARQ-ACK timing: this may mean a time from when a V2X reception UE 420 receives SL control information and data information from a V2X transmission UE 410 to when the V2X reception UE transmits HARQ-ACK/negative ACK (NACK) information to the V2X transmission UE 410 in response to the received information. In this case, a unit of the time may be a slot or one or more orthogonal frequency division multiplexing (OFDM) symbols.

(1-3) PSFCH format or HARQ feedback method: When two or more PSFCH formats are used, one PSFCH format may be used to transmit HARQ-ACK/NACK information including one bit or two bits. Another PSFCH format may be used to transmit HARQ-ACK/NACK information including 3 bits or more. Meanwhile, when the HARQ-ACK/NACK information is transmitted through the PSFCH, ACK information and NACK information may be transmitted through the PSFCH, respectively. In this case, when the V2X reception UE 420 succeeds in decrypting the PSSCH transmitted from the V2X transmission UE 410, the V2X reception UE 420 may transmit an ACK to the PSFCH. When the V2X reception UE 420 fails in the decryption, the V2X reception UE 420 may transmit the NACK to the PSFCH. In another example, the V2X reception UE 420 may not transmit an ACK when succeeding in decrypting a PSSCH transmitted from the V2X transmission UE 410 and may transmit a NACK through a PSFCH when failing in the decryption. On the other hand, when one PSFCH format is used, information about the above-described HARQ feedback method (whether ACK information and NACK information are to be transmitted through a PSFCH or NACK information is to be transmitted through the PSFCH) may be included.

(1-4) Time/frequency/code resource constituting a PSFCH or a set of resources: for a time resource, an index of a slot or a symbol in which the PSFCH is transmitted and a period may be included. For the frequency resource, a frequency block (a resource block (RB)) in which the PSFCH is transmitted or a start point and an end point (or a start point and a length of the frequency resource) of a sub-channel including two or more consecutive blocks may be included.

4. Information about whether blind retransmission is used may be included in resource pool configuration information.

Blind retransmission may mean that, unlike HARQ-ACK/NACK-based retransmission, a transmission UE repeatedly performs retransmission without receiving feedback information regarding an ACK or a NACK from a reception UE. When blind retransmission is used, the blind retransmission count may be included in resource pool information. For example, when the blind retransmission count is configured to 4, the transmission UE may identical information four times each time when the transmission UE transmits a PSCCH/PSSCH to a reception UE. In this case, a redundancy version (RV) value may be included in SL control information (SCI) transmitted through the PSCCH.

5. Information about a demodulation reference signal (DMRS) pattern that may be used in a PSSCH transmitted in a corresponding resource pool The DMRS pattern that may be used in the PSSCH may vary with a speed of a UE. For example, for a high speed of a UE, to improve the accuracy of channel estimation, the number of OFDM symbols used in DMRS transmission in a time domain needs to be increased. For a low speed of the UE, the accuracy of channel estimation may be guaranteed even with a small number of DMRS symbols, such that the number of OFDM symbols used in DMRS transmission in the time axis needs to be reduced so as to reduce a DMRS overhead. Thus, information about a resource pool may include information about a DMRS pattern available in the resource pool. In this case, two or more DMRS patterns may be set in one resource pool, and the V2X transmission UE 410 may select and use one from among DMRS patterns set based on a speed of the V2X transmission UE 410. The V2X transmission UE 410 may transmit information about the DMRS pattern selected by the V2X transmission UE 410 to the V2X reception UE 420 through SCI of the PSCCH. The V2X reception UE 420 may receive the information to obtain DMRS pattern information, perform channel estimation for the PSSCH, and perform demodulation and decryption to obtain SL data information.

6. Whether an SL channel state information reference signal (CSI-RS) is used (1) When the SL CSI-RS is used, at least one of the following information may be included:

(1-1) CSI-RS Transmission Start Point: this may mean a start point at which the V2X transmission UE 410 has to transmit a CSI-RS to the V2X reception UE 420. This start point may refer to an index of a slot in which the CSI-RS is transmitted, an index of a symbol in which the CSI-RS is transmitted, or both the index of the slot and the index of the symbol.

(1-2) CSI reporting timing: this may mean a time from when the V2X reception UE 420 receives the CSI-RS from the V2X transmission UE 410, i.e., an index of a slot in which the CSI-RS is received, or an index of a symbol in the slot in which the CSI-RS is received, to a time when the V2X reception UE 420 transmits a CSI report to the V2X transmission UE 410, i.e., an index of a slot in which the CSI report is transmitted or an index of a symbol in the slot in which the CSI report is transmitted. In this case, a unit of the time may be a slot or one or more OFDM symbols.

7. Parameter for SL transmission power control (1) For SL transmission power control, an SL pathloss estimation value may be required. In addition, when an Uu carrier and an SL carrier of a base station are the same as each other, SL transmission power control may operate based on a DL pathloss estimation value to reduce interference caused by SL transmission in an UL signal received by a base station reception end. To this end, the base station 400 may configure whether the V2X transmission UE 410 needs to set an SL transmission power based on an SL pathloss estimation value, whether the V2X transmission UE 410 needs to configure the SL transmission power based on a DL pathloss estimation value, or whether the V2X transmission UE 410 needs to configure the SL transmission power based on both the SL pathloss estimation value and the DL pathloss estimation value. For example, when the base station 400 configures a synchronization signal block SSB or a DL CSI-RS as a signal that has to be used for pathloss estimation, the UE may configure the SL transmission power based on the DL pathloss value. When the base station 400 configures an SL DMRS or an SL CSI-RS as a signal that has to be used for pathloss estimation, the UE may configure the SL transmission power based on the SL pathloss value.

(2) As described above, according to a signal to be used for pathloss estimation, a different transmission power parameter may be configured.

While the foregoing description has been made using an example in which the above-described information is included in a resource pool configuration, the disclosure is not limited to the foregoing description. That is, the above-described information may be configured in the V2X transmission UE 410 or the V2X reception UE 420 independently of resource pool configuration.

Referring to FIG. 4, upon generation of data to be transmitted from the V2X transmission UE 410 to the V2X reception UE 420, the V2X transmission UE 410 may request an SL resource to be transmitted to the V2X transmission UE 410 from the base station 400 by using a scheduling request (SR) or/and a buffer status report (BSR). The base station 400 having received the BSR may identify that the V2X transmission UE 410 has data for SL transmission, and determine a resource required for SL transmission based on the BSR.

The base station 400 may transmit an SL scheduling grant including at least one of resource information for SCI transmission, resource information for SL data transmission, or resource information for SL feedback transmission to the V2X transmission UE 410. The SL scheduling grant, which is information for granting dynamic scheduling in an SL, may be downlink control information (DCI) transmitted on a physical downlink control channel (PDCCH). The SL scheduling grant may include information indicating a bandwidth part (BWP) in which SL transmission is performed and a carrier indicator field (CIF) or a carrier frequency indicator in which SL transmission is performed for an NR base station, and may include the CIF for an LTE base station. The SL scheduling grant may further include resource allocation information of a PSFCH in which feedback information regarding SL data, i.e., ACK/NACK information is transmitted. The resource allocation information may include information for allocating a plurality of PSFCHs for a plurality of UEs in a group when SL transmission corresponds to groupcast transmission. The resource allocation information of the feedback information may be information indicating at least one of a plurality of feedback information resource candidate sets configured by higher layer signaling.

The V2X transmission UE 410 having received the SL scheduling grant may transmit the SCI for scheduling the SL data according to the SL scheduling grant to the V2X reception UE 420 on the PSCCH, and transmit the SL data on the PSSCH. The SCI may include at least one of resource allocation information used in SL data transmission, modulation and coding scheme (MCS) information applied in the SL data, group destination ID information, source ID information, unicast destination ID information, power control information for controlling SL power, timing advance (TA) information, DMRS configuration information for SL transmission, e.g., information about the number of repeated packet transmissions, resource allocation information corresponding to repeated packet transmissions, a redundancy version (RV), or an HARQ process ID. The SCI may further include information indicating a resource in which feedback information regarding SL data, i.e., ACK/NACK information is transmitted.

The V2X reception UE 420 having received the SCI may receive SL data. Thereafter, the V2X reception UE 420 may transmit ACK/NACK information indicating a success or a failure in decoding of SL data to the V2X transmission UE 410 on a PSFCH. The transmission of the feedback information for the SL may be applied to unicast transmission or groupcast transmission, but broadcast transmission is not excluded. When SL transmission corresponds to groupcast transmission, each UE having received groupcast data may transmit feedback information by using a different PSFCH resource. Each UE having received the groupcast data may transmit feedback information by using an identical PSFCH resource, and in this case, feed back NACK information. That is, a UE having received data may not feed back an ACK. In this case, the PSFCH resource may include not only a resource identified in a time domain or/and a frequency domain, but also a resource identified using a scrambling code, an orthogonal cover code, etc., and a resource identified using a different sequence and a cyclic shift applied to the different sequence.

The base station 400 may configure the V2X transmission UE 410 to report an HARQ feedback received from the V2X reception UE 420 by using system information or an RRC. In this case, the V2X transmission UE 410 may transmit an SL HARQ feedback received from the V2X reception UE 420 to the base station 400 through a physical uplink control channel (PUCCH) or a physical uplink shared channel (PUSCH). The base station 400 may configure whether the V2X transmission UE 410 may be able to multiplex and transmit SL HARQ feedback information received from the V2X reception UE 420 and uplink control information (CUI) for existing Uu.

When the base station 400 does not configure to multiplex the SL HARQ feedback information and the UCI, the V2X transmission UE 410 may not be able to multiplex the SL HARQ feedback information and the UCI for the Uu and transmit them to one PUCCH. In this case, the base station 400 may independently configure a PUCCH for transmitting the SL HARQ feedback information and a PUCCH for transmitting the UCI. That is, there is an independent PUCCH in which the SL HARQ feedback information is transmitted, and any UCI may not be transmitted in the PUCCH.

On the other hand, when the base station 400 configures to multiplex the SL HARQ feedback information and the UCI, the V2X transmission UE 410 may multiplex the SL HARQ feedback information and the UCI and transmit them through one PUCCH. Assuming the SL HARQ feedback information to be of N1 bits and the UCI to be of N2 bits, the order of multiplexing may follow N2+N1 (i.e., the SL HARQ feedback information is multiplexed after the UCI). When a code rate for a sum of SL HARQ feedback bits and UCI bits multiplexed and transmitted in a PUCCH is greater than a code rate configured by the base station 400, the V2X transmission UE 410 may give up transmitting the SL HARQ feedback information (i.e., drop the SL HARQ feedback information).

FIG. 4 assumes a scenario in which the V2X transmission UE 410 is in a state of being UL-connected to the base station 400 (i.e., the RRC-connected state), and both the V2X transmission UE 410 and the V2X reception UE 420 exist in a coverage of the base station 400. Although not shown in FIG. 4, when the V2X transmission UE 410 has not configured UL connection to the base station 400 (i.e., an RRC idle state), the V2X transmission UE 410 may perform a random access procedure for UL connection setup with the base station 400. Although not shown in FIG. 4, in a scenario in which the V2X transmission UE 410 exists in the coverage of the base station 400 and the V2X reception UE 420 exists out of the coverage of the base station 400, information for V2X communication may be preset in the V2X reception UE 420 that may then use the preset information. Meanwhile, the information for V2X communication may be preset from the base station 400 in the V2X transmission UE 410, as shown in FIG. 4. When both the V2X transmission UE 410 and the V2X reception UE 420 exist out of the coverage of the base station 400, the information for V2X communication may be preset in the V2X transmission UE 410 and the V2X reception UE 420 which may then use the preset information. In this case, the presetting may mean using a value embedded in a UE at the time of release of the UE. In another example, the presetting may include, when the V2X transmission UE 410 or the V2X reception UE 420 has ever obtained the information for V2X communication through RRC setup by connecting to the base station 400 or has ever obtained the information for V2X communication through system information of the base station 400, using information obtained most recently.

Although not shown in FIG. 4, it may be assumed that before the V2X transmission UE 410 transmits an SR/BSR to the base station 400, the V2X transmission UE 410 has completed service discovery, a UE-to-UE direct link connection setup procedure, and a PC5 RRC setup procedure with the V2X reception UE 420 through the procedure mentioned with reference to FIG. 3.

Figure 5:
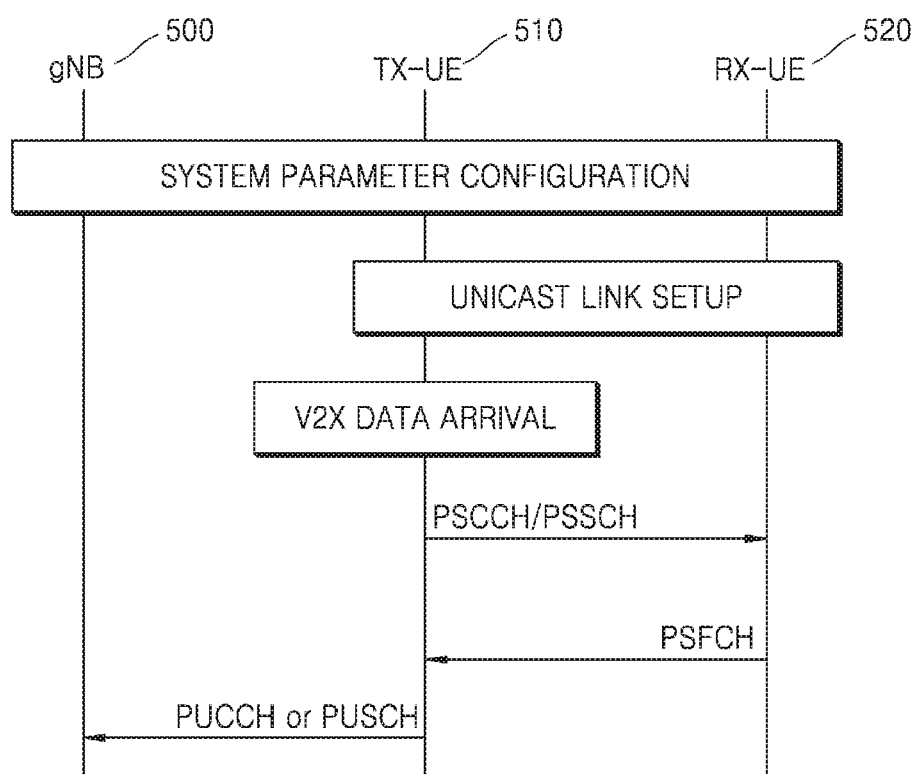
FIG. 5 is a view for describing a V2X unicast communication procedure, according to an embodiment of the disclosure.

FIG. 5 is a view for describing a V2X unicast communication procedure, according to an embodiment of the disclosure.

More specifically, FIG. 5 is a view for describing a V2X communication procedure based on mode 2 resource allocation described with reference to FIGS. 2A and 2B. In FIG. 5, a base station 500 may configure a parameter for V2X communication for V2X transmission and reception UEs in a cell through system information. The parameter may include at least one of parameter information described with reference to FIG. 4.

Referring to FIG. 5, upon generation of data to be transmitted to the V2X reception UE 520 in the V2X transmission UE 510, the V2X transmission UE 510 may transmit SCI to the V2X reception UE 520 on the PSCCH and transmit SL data to the V2X reception UE 520 on the PSSCH. The SCI may include at least one of resource allocation information used in SL data transmission, MCS information applied in the SL data, group destination ID information, source ID information, unicast destination ID information, power control information for controlling SL power, TA information, DMRS configuration information for SL transmission, e.g., information about the number of repeated packet transmissions, resource allocation information corresponding to repeated packet transmissions, an RV, or an HARQ process ID. The SCI may further include information indicating a resource in which feedback information regarding SL data, i.e., ACK/NACK information is transmitted.

The V2X reception UE 520 having received the SCI may receive SL data. Thereafter, the V2X reception UE 520 may transmit ACK/NACK information indicating a success or a failure in decoding of SL data to the V2X transmission UE 510 on the PSFCH. The transmission of the feedback information for the SL may be applied to unicast transmission or groupcast transmission, but broadcast transmission is not excluded. When SL transmission corresponds to groupcast transmission, each UE having received groupcast data may transmit feedback information by using a different PSFCH resource. Each UE having received the groupcast data may transmit feedback information by using an identical PSFCH resource, and in this case, may feed back NACK information (i.e., do not feed back ACK information when the UE having received data determines the ACK information). In this case, the PSFCH resource may include not only a resource identified in a time domain or/and a frequency domain, but also a resource identified using a scrambling code, an orthogonal cover code, etc., and a resource identified using a different sequence and a cyclic shift applied to the different sequence.

As shown in FIG. 4, in FIG. 5, the base station 500 may configure the V2X transmission UE 510 to report an HARQ feedback received from the V2X reception UE 520 by using system information or an RRC. In this case, the V2X transmission UE 510 may transmit an SL HARQ feedback received from the V2X reception UE 520 to the base station 500 through a PUCCH or a PUSCH. The base station 500 may configure whether the V2X transmission UE 510 may be able to multiplex and transmit SL HARQ feedback information received from the V2X reception UE 520 and UCI for existing Uu.

When the base station 500 does not configure to multiplex the SL HARQ feedback information and the UCI, the V2X transmission UE 510 may not be able to multiplex the SL HARQ feedback information and the UCI for the Uu and transmit them to one PUCCH. In this case, the base station 500 may independently configure a PUCCH for transmitting the SL HARQ feedback information and a PUCCH for transmitting the UCI. That is, there is an independent PUCCH in which the SL HARQ feedback information is transmitted, and any UCI may not be transmitted in the PUCCH.

On the other hand, when the base station 500 configures to multiplex the SL HARQ feedback information and the UCI, the V2X transmission UE 510 may multiplex the SL HARQ feedback information and the UCI and transmit them through one PUCCH. Assuming the SL HARQ feedback information to be of N1 bits and the UCI to be of N2 bits, the order of multiplexing may follow N2+N1 (i.e., the SL HARQ feedback information is multiplexed after the UCI). When a code rate for a sum of SL HARQ feedback bits and UCI bits multiplexed and transmitted in a PUCCH is greater than a code rate configured by the base station 500, the V2X transmission UE 510 may give up transmitting the SL HARQ feedback information (i.e., drop the SL HARQ feedback information).

FIG. 5 assumes a scenario in which V2X transmission and reception UE 520s exist in the coverage of the base station 500. Although not shown in FIG. 5, FIG. 5 may also be applied to a case where all of the V2X transmission and reception UE 520s exist out of the coverage of the base station 500. In this case, the information for V2X communication may be preset for the V2X transmission and reception UEs. Although not shown in FIG. 5, FIG. 5 may also be applied to a scenario where one of the V2X transmission and reception UEs exists in the coverage of the base station 500 and the other UE exists out of the coverage of the base station 500. In this case, the information for V2X communication may be configured from the base station 500 for a UE existing in the coverage of the base station 500, and the information for V2X communication may be preset for a UE existing out of the coverage of the base station 500. In this case, the 'information for V2X communication' may be interpreted as information about at least one of the parameters for V2X communication described above with reference to FIG. 4. The presetting may mean using a value embedded in a UE at the time of release of the UE. In another example, the presetting may include, when the V2X transmission UE 510 or the V2X reception UE 520 has ever obtained the information for V2X communication through RRC setup by connecting to the base station 500 or has ever obtained the information for V2X communication through system information of the base station 500, using information obtained most recently.

Although not shown in FIG. 5, it may be assumed that before the V2X transmission UE 510 transmits a PSCCH/PSSCH to the V2X reception UE 520, the V2X transmission UE 510 has completed service discovery, a direct link connection setup procedure, and a PC5 RRC setup procedure with the V2X reception UE 520 through the procedure mentioned with reference to FIG. 3.

While a description has been made with reference to FIG. 5 by using an example of unicast communication where one V2X reception UE 520 exists, the description may be equally applied to groupcast communication and broadcast communication where two or more V2X reception UE 520s exist.

Figure 6:
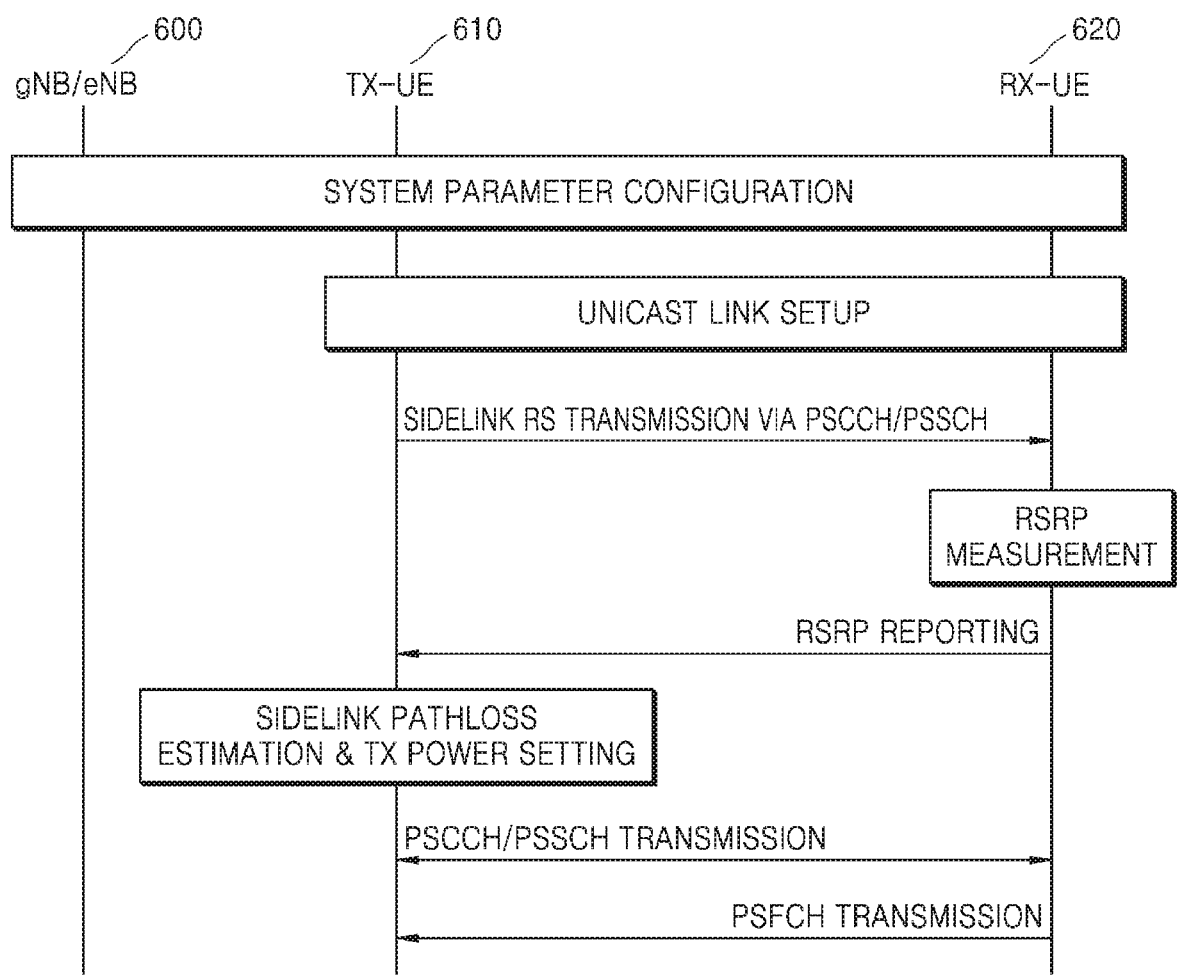
FIG. 6 is a view for describing a method for estimating sidelink pathloss in V2X unicast communication, according to an embodiment of the disclosure.

FIG. 6 is a view for describing a method for estimating sidelink pathloss in V2X unicast communication, according to an embodiment of the disclosure.

Referring to FIG. 6, V2X UEs 610 and 620 in the coverage of the base station 600 may perform DL synchronization and obtain system information. In this case, DL synchronization may be performed through a primary synchronization signal (PSS)/secondary synchronization signal (SSS) received from the base station 600 or a synchronization signal received from a global navigation satellite system (GNSS). The V2X UEs 610 and 620 having performed DL synchronization may obtain system information related to V2X through a V2X dedicated system information block (SIB) transmitted from the base station 600. The V2X UEs 610 and 620 in the coverage may perform UL synchronization through a random access procedure with the base station 600 and perform an RRC connection procedure. The UL synchronization and the RRC connection procedure may be performed by either the transmission UE 610 or the reception UE 620 or both of them.

The V2X transmission UE 610 having performed the UL synchronization and the RRC connection setup with the base station 600 may perform unicast link setup. Before the UL synchronization and the RRC connection setup with the base station 600, unicast link setup between the V2X UEs 610 and 620 may be performed. Such unicast link setup may be performed in an upper layer (e.g., an application layer or a PC5 RRC layer), and as shown in FIG. 6, unicast link setup may be performed between the V2X transmission UE 610 to transmit V2X control information/data information in a unicast manner and the V2X reception UE 620 to receive the V2X control information/data information in the unicast manner. Although not shown in FIG. 6, the base station 600 may engage in unicast link setup between SL UEs. For example, the V2X transmission UE 610 may transmit a request for unicast link setup to the base station 600 which may then transmit a response for unicast link setup to the reception UE 620. The base station 600 may also transmit confirmation with respect to unicast link setup to the V2X transmission UE 610 and the V2X reception UE 620. However, as mentioned above, this procedure may be performed in the upper layer and thus may not be identified in a physical layer and a MAC layer.

Meanwhile, although not shown in FIG. 6, the base station 600 may command transmission of an SL pathloss estimation signal to the V2X transmission UE 610. In this case, the command of the base station 600 may be transmitted to the V2X transmission UE 610 through UE-specific DCI (or group common DCI) for an SL or through a MAC CE or UE-specific RRC. When the command for transmission of the pathloss estimation signal is transmitted through the UE-specific DCI or the group common DCI, the DCI may use a radio network temporary identifier (RNTI) that is different from a UE-specific DCI or a group common DCI that is used in existing cellular communication to distinguish from existing cellular communication.

In another embodiment of the disclosure, the V2X transmission UE 610 may transmit the pathloss estimation signal after unicast link setup without the command of the base station 600. For example, the V2X transmission UE 610 may start a timer from receipt of a request for unicast link setup or from success in unicast link setup, and may transmit the pathloss estimation signal upon expiry of the timer. Likewise, the V2X reception UE 620 may start a timer from transmission of a request for unicast link setup or from success in unicast link setup, and may expect receipt of the pathloss estimation signal from the V2X transmission UE 610 upon expiry of the timer. In another embodiment of the disclosure, the V2X transmission UE 610 may transmit the pathloss estimation signal after the elapse of a certain time (e.g., [x] subframe, [x] slot, or [x] ms) from success in unicast link setup. Similarly, the V2X reception UE 620 may receive the pathloss estimation signal from the V2X transmission UE 610 after the elapse of a certain time (e.g., [x] subframe, [x] slot, or [x] ms) from success in unicast link setup.

In another example where the V2X transmission UE 610 transmits the pathloss estimation signal without the command of the base station 600, the V2X transmission UE 610 may transmit the pathloss estimation signal to the V2X reception UE 620, when a reference signal received power (RSRP) value of the base station 600, measured by the V2X transmission UE 610, is greater than or equal to (or greater than) a certain threshold value configured by the base station 600 or is less than or equal to (or less than) a certain threshold value. In this case, the base station 600 may transmit the RSRP value to the V2X transmission UE 610 through a SIB for V2X (V2X SIB) or a UE-specific RRC/common RRC message for V2X. In another example, when a variation of the RSRP value of the base station 600 is greater than or equal to (or greater than) a certain threshold value configured by the base station 600, the V2X transmission UE 610 may transmit the pathloss estimation signal to the V2X reception UE 620. Meanwhile, even when the V2X transmission UE 610 satisfies a condition for the RSRP value, which is configured by the base station 600, the V2X transmission UE 610 may stop transmitting the pathloss estimation signal upon receipt of a command for stopping the pathloss estimation signal from the base station 600.

In another example where the V2X transmission UE 610 transmits the SL pathloss estimation signal without the command of the base station 600, the V2X transmission UE 610 may transmit the pathloss estimation signal when a modulation order of V2X data information to be transmitted by the V2X transmission UE 610 is greater than or equal to or greater than a certain level. For example, when the modulation order of the V2X data information to be transmitted by the V2X transmission UE 610 is greater than 64-quadrature amplitude modulation (QAM) (or 256-QAM that is greater than 64-QAM), the V2X transmission UE 610 may transmit the pathloss estimation signal to the V2X reception UE 620. In another example, the V2X transmission UE 610 may transmit the pathloss estimation signal when an aggregation level of V2X control information to be transmitted by the V2X transmission UE 610 is less than or equal to or less than a certain level (e.g., when the aggregation level is equal to or less than 8 or is equal to 4 that is less than 8). In another example, when a transport block size (TBS) of the V2X data information to be transmitted by the V2X transmission UE 610 is greater than or equal to a certain number of bits (or greater than a certain number of bits), the V2X transmission UE 610 may transmit the pathloss estimation signal to the V2X reception UE 620. In another example, when there are SL control information and data information to be transmitted by the V2X transmission UE 610 to the V2X reception UE 620, the V2X transmission UE 610 may transmit the pathloss estimation signal to the V2X reception UE 620 at all times, together with the SL control information and data information.

In another embodiment where the V2X transmission UE 610 transmits the pathloss estimation signal to the V2X reception UE 620 without the command of the base station 600, the V2X transmission UE 610 may transmit the pathloss estimation signal to the V2X reception UE 620, when an RSRP value of an SL channel, measured previously by the V2X transmission UE 610, is greater than or equal to (or greater than) a certain threshold value configured by the base station 600 or is less than or equal to (or less than) a certain threshold value. In this case, the base station 600 may transmit the RSRP threshold value of the SL channel to the V2X transmission UE 610 through a SIB for V2X (V2X SIB) or a UE-specific RRC/common RRC message for V2X. In this case, when the RSRP value of the SL channel satisfies a certain threshold value condition configured by the base station 600, the V2X transmission UE 610 may transmit the pathloss estimation signal to the V2X reception UE 620. Alternatively, when the RSRP value of the SL channel satisfies the certain threshold value condition X times or more, the V2X transmission UE 610 may transmit the pathloss estimation signal to the V2X reception UE 620. In this case, X may be predefined or may be configured by the base station 600. In still example, when a variation of the RSRP value of the SL channel is greater than or equal to (or greater than) a certain threshold value configured by the base station 600, the V2X transmission UE 610 may transmit the pathloss estimation signal to the V2X reception UE 620. Meanwhile, even when the V2X transmission UE 610 satisfies a condition for the RSRP threshold value of the SL channel, which is configured by the base station 600, the V2X transmission UE 610 may stop transmitting the pathloss estimation signal when the base station 600 commands stop of transmission of the pathloss estimation signal. In another example, a threshold value for a variation of an RSRP value of an SL channel or a threshold value for an RSRP value of an SL channel may be previously configured without signaling from the base station 600.

In another example where the V2X transmission UE 610 transmits the SL pathloss estimation signal to the V2X reception UE 620 without the command of the base station 600, the base station 600 may set to apply an SL pathloss value to SL transmission power control for the V2X transmission UE 610 through system information or RRC. The V2X transmission UE 610 being set by the base station 600 may transmit the pathloss estimation signal in transmission of SL data at all times. That is, when the V2X transmission UE 610 has no SL data to be transmitted, the V2X transmission UE 610 may not transmit the pathloss estimation signal.

In the foregoing examples where the V2X transmission UE 610 transmits the pathloss estimation signal to the V2X reception UE 620, the V2X transmission UE 610 may mean a UE having a capability to transmit the pathloss estimation signal for V2X. Thus, among UEs having the capability, V2X transmission UE 610s satisfying the aforementioned conditions may transmit the pathloss estimation signal.

The V2X reception UE 620 having received the pathloss estimation signal may measure an RSRP by using the signal. The V2X reception UE 620 may also report L1-RSRP and L3-RSRP measured by the V2X reception UE 620 to the V2X transmission UE 610. In this case, according to whether L1-RSRP is reported or L3-RSRP is reported, an operation of the V2X reception UE 620 and an operation of the V2X transmission UE 610 may vary as below.

(1) When the V2X reception UE 620 reports L1-RSRP

For pathloss estimation, an L3-RSRP value filtered in layer 3 may be required. More specifically, the physical layer (layer 1) may calculate an L1-RSRP value and deliver L1-RSRP to layer 3 which obtains an average in the time domain by using the L1-RSRP value delivered from the physical layer, thus obtaining the L3-RSRP value. For more accurate pathloss estimation, an average needs to be obtained during a sufficiently long time.

When the reception UE 620 reports the L1-RSRP to the transmission UE 610, the above-described L3 filtering operation has to be performed during a sufficiently long time for accurate pathloss estimation. To this end, the reception UE 620 may have to report the L1-RSRP value to the transmission UE 610 several times. The L1-RSRP value may be calculated in the layer 1, and thus may be transmitted through the PSFCH or the PSSCH. Thus, when the reception UE 620 reports the L1-RSRP value to the transmission UE 610 several times, it may mean that the reception UE 620 has to transmit the PSFCH or the PSSCH to the transmission UE 610 several times. The V2X UE may not be able to perform transmission and reception at the same time, such that when the reception UE 620 transmits the PSFCH or the PSSCH several times, the reception UE 620 may not be able to receive SL control information and data information that may be transmitted from another transmission UE 610. The V2X UE may not be able to transmit two or more different channels at the same time in one carrier (i.e., two or more different channels may not be frequency-multiplexed and transmitted in one carrier). Thus, when the reception UE 620 transmits the PSFCH or the PSSCH to the transmission UE 610 several times to report L1-RSRP, the reception UE 620 may not be able to transmit SL control information and data information to another UE.

As another problem likely to occur when the reception UE 620 reports L1-RSRP to the transmission UE 610, agreement may be required between the transmission UE 610 and the reception UE 620 such that the transmission UE 610 receives L1-RSRP transmitted from the reception UE 620 and performs L3 filtering. More specifically, the transmission UE 610 may expect report of L1-RSRP from the reception UE 620 every [x1] ms or every [x2] slots. However, when there is no PSFCH or PSSCH resource for reporting L1-RSRP or serious congestion occurs in spite of existence of the PSFCH or PSSCH resource, at the time when the reception UE 620 reports L1-RSRP, L1-RSRP may not be reported to the transmission UE 610. Thus, in order for the transmission UE 610 to perform L3 filtering by using L1-RSRP reported from the reception UE 620, a sufficiently long reception window time needs to be secured. That is, when the transmission UE 610 expects that L1-RSRP is to be reported from the reception UE 620 every [x1] ms or every [x2] slots, the transmission UE 610 may attempt reception of L1-RSRP during+Δ1 ms or −Δ1 ms from [x1] ms or attempt reception of L1-RSRP during+Δ2 ms or −Δ2 ms from a [x2] slot.

Also, to perform L3 filtering, the transmission UE 610 may have to perform filtering during a total of [x4] ms or a total of [x3] L1-RSRP values reported from the RX UE every [x1] ms or every [x2] slots. Thus, the reception UE 620 may have to continuously perform transmission to the transmission UE 610 until the number of LS-RSRP values reported every [x1] ms or every [x2] slots is a total of [x3]. Thus, the reception UE 620 may have to continuously transmit the L1-RSRP reported every [x1] ms or every [x2] slots up to a total of [x4] ms. In another example, the transmission UE 610 may command stop of reporting of the L1-RSRP to the reception UE 620. The reception UE 620 may report the L1-RSRP value every [x1] ms or every [x2] slots until the reception UE 620 receives the command for stopping reporting of the L1-RSRP from the transmission UE 610.

[x1], [x2], [x3], [x4], Δ1, Δ2, and filtering coefficients for performing L3 filtering may be configured by the base station 600 through system information or RRC signaling. In another example, the transmission UE 610 and the reception UE 620 may perform PC-5 RRC connection setup in unicast link connection setup, and in this case, through PC-5 RRC signaling. In another example, the parameters may be fixed values, which may mean values embedded in the transmission UE 610 and the reception UE 620.

(2) When the V2X reception UE 620 reports L3-RSRP

Unlike when the V2X reception UE 620 reports L1-RSRP to the transmission UE 610, when the reception UE 620 reports L3-RSRP to the transmission UE 610, the reception UE 620 may report an RSRP once to the transmission UE 610. Thus, problems occurring when the reception UE 620 reports L1-RSRP to the transmission UE 610 may be solved. However, in case of L3-RSRP reporting, a final value of an RSRP to be reported is generated in layer 3, such that an L3-RSRP has to be reported from RRC of the reception UE 620 to RRC of the transmission UE 610 through a PSSCH.

Agreement may be required between the transmission UE 610 and the reception UE 620 such that the transmission UE 610 receives the L3-RSRP transmitted from the reception UE 620 to estimate an SL pathloss value. More specifically, the transmission UE 610 may expect report of the L3-RSRP value from the reception UE 620 after [x1] ms or [x2] slot from its transmission of the SL pathloss estimation signal. However, when there is no PSSCH resource for reporting L3-RSRP or serious congestion occurs in spite of existence of the PSSCH resource, at the time when the reception UE 620 reports L3-RSRP, L3-RSRP may not be reported to the transmission UE 610. Thus, in order for the transmission UE 610 to estimate the SL pathloss value by using L3-RSRP reported from the reception UE 620, a sufficiently long reception window time needs to be secured. That is, when the transmission UE 610 expects that L3-RSRP is to be reported from the reception UE 620 after [x1] ms or [x2] slot from its transmission of the SL pathloss estimation signal, the transmission UE 610 may attempt reception of L3-RSRP during+41 ms or −41 ms from [x1] ms or attempt reception of L3-RSRP during+42 ms or −42 ms from a [x2] slot. Meanwhile, the L3-RSRP value is an upper layer message transmitted through a PSSCH, and thus may be retransmitted when HARQ-ACK transmission is set.

[x1], [x2], [x3], [x4], 41, 42, and filtering coefficients for performing L3 filtering may be configured by the base station 600 through system information or RRC signaling. In another example, the transmission UE 610 and the reception UE 620 may perform PC-5 RRC connection setup in unicast link connection setup, and in this case, through PC-5 RRC signaling. In another example, the parameters may be fixed values, which may mean values embedded or preconfigured in the transmission UE 610 and the reception UE 620.

Meanwhile, the foregoing L1-RSRP or L3-RSRP may be transmitted through a MAC-CE.

The V2X transmission UE 610 having obtained the L3-RSRP value by performing L3 filtering using the L1-RSRP values received from the V2X reception UE 620 or having received a report of the L3-RSRP value from the V2X reception UE 620 may estimate the SL pathloss value through [Equation 1].

$$\text{Pathloss Value}=\text{referenceSignalPower}-L3\text{-RSRP} \quad \text{Equation 1}$$

In [Equation 1], referenceSignalPower may mean a transmission power of a pathloss estimation signal used when the V2X transmission UE 610 transmits the pathloss estimation signal.

The V2X transmission UE 610 having estimated the SL pathloss value using [Equation 1] may apply the SL pathloss value to an SL transmission power to transmit the PSCCH and the PSSCH. How to apply the SL pathloss value to the transmission powers of the PSCCH and the PSSCH will be described with reference to FIGS. 7A and 7B When the V2X reception UE 620 receives the PSCCH and the PSSCH and the PSFCH resource is configured in the resource pool in which the PSCCH and the PSSCH are received, the V2X reception UE 620 may transmit an HARQ feedback to the V2X transmission UE 610 through the PSFCH.

Figure 7A:
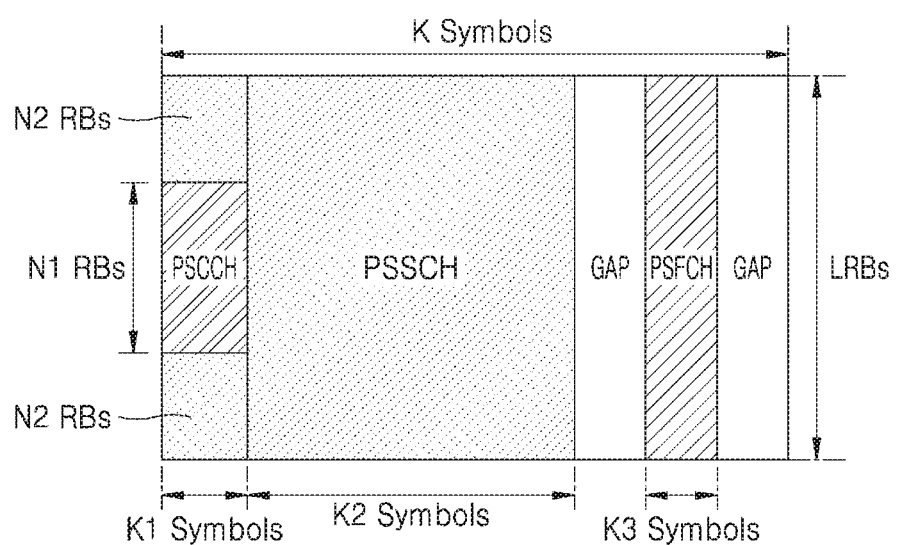
FIGS. 7A and 7B are views for describing a method for describing a sidelink slot structure, according to various embodiments of the disclosure.
Figure 7B:
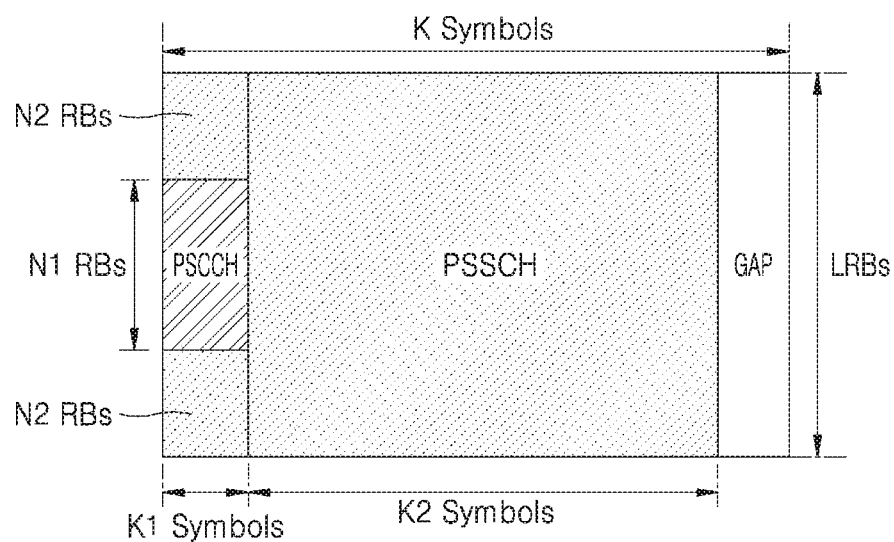

FIGS. 7A and 7B are views for describing a method for describing a sidelink slot structure, according to various embodiments of the disclosure.

Referring to FIGS. 7A and 7B, an SL slot may include K symbols and L frequency blocks. More specifically, FIG. 7A shows that a PSCCH and a PSSCH undergo frequency-division-duplexing (FDM) in K1 symbols and the PSSCH is transmitted in K2 symbols without transmission of the PSCCH. There is a PSFCH in K3 symbols, in which K3 may be 1 or an integer that is greater than 1. Between the PSSCH and the PSFCH, a guard symbol or a GAP symbol (guard symbol 1) may exist for switching between transmission and reception. It is also shown that in a tail of the SL slot, a guard symbol or a GAP symbol (guard symbol 2) may exist for switching between transmission and reception. That is, K1+K2+guard symbol 1+K3+guard symbol 2≤K, and guard symbol 1 and guard symbol 2 may be one or two or more OFDM symbols. In this case, guard symbol 1 and guard symbol 2 may be OFDM symbols having different lengths. For example, guard symbol 1 may include two OFDM symbols and guard symbol 2 may include one OFDM symbol.

FIG. 7B, like FIG. 7A, shows that a PSCCH and a PSSCH undergo FDM in K1 symbols and the PSSCH is transmitted in K2 symbols without transmission of the PSCCH. However, unlike FIG. 7A, FIG. 7B shows that a resource for PSFCH transmission does not exist in an SL slot. In this case, guard symbol 1 may not exist between a PSCCH symbol and a PSFCH symbol shown in FIG. 7B.

In FIGS. 7A and 7B, a frequency resource block size of a PSCCH may be N1 and a frequency resource block size of a PSSCH may be N2. That is, the PSCCH may include N1 frequency blocks and K1 symbols. The PSSCH may include N2 frequency blocks in a K1-symbol length and may be frequency-multiplexed with the PSCCH. The PSSCH may include L frequency blocks without being frequency-multiplexed with the PSCCH in a K2-symbol length. In this case, N1 and N2 may be equal to or different from each other, in which N1+N2≤L. In FIGS. 7A and 7B, N1 frequency blocks of the PSCCH and N2 frequency blocks of the PSSCH are physically continuously located, but may not be physically continuous (i.e., may be logically continuously located and may be physically discontinuous).

While it is shown in FIG. 7A that the frequency resource block size of the PSFCH is equal to that of the PSSCH as L, it may be less than L. In this case, the frequency resource block size of the PSFCH may be that of the PSCCH or the PSSCH. The V2X reception UE may decode the PSSCH and transmit ACK/NACK information to the V2X transmission UE through the PSFCH.

As shown in FIGS. 7A and 7B, the V2X transmission UE may transmit SCI through the PSCCH including K1 symbols and N2 frequency blocks. The SCI may be transmitted including time/frequency allocation information of the PSSCH including (K1+K2) symbols and L frequency blocks. The SCI may also include information about the number of guard symbol 1 or guard symbol 2. The V2X reception UE may receive and decode the PSCCH transmitted from the transmission UE and then obtain time/frequency allocation information of the PSSCH and decode the PSSCH. In FIGS. 7A and 7B, the PSSCH including the K2 symbols are physically continuously located after K1 symbols of the PSCCH, but may not be physically continuous (i.e., may be logically continuously located and may be physically discontinuous).

At an $i^{th}$ transmission point, the V2X transmission UE using the SL slot structure of FIGS. 7A and 7B may control transmission powers of the PSCCH, the PSSCH, and the PSFCH for SL unicast transmission. In this case, an equation for transmission power control of each channel may be a function including at least one of the following parameters:

Pcmax(i): this may mean a maximum transmission power of a UE in SL transmission, and may be determined by the UE based on a P-max value (in the absence of a base station, a preconfigured value) configured through system information or RRC from the base station, a power class of the UE embedded in the UE, etc.;

$P_0$: this may mean a value (in the absence of a base station, a preconfigured value) configured through system information or RRC from the base station to guarantee the link quality of the reception UE. The required link quality may vary with a type of an SL channel, such that $P_0$ used in the PSCCH, the PSSCH, and the PSFCH may be different (i.e., $P_{0\_PSCCH}$, $P_{0\_PSSCH}$, and $P_{0\_PSFCH}$), $\alpha_{PSCCH}$: this may mean a value between 0 and 1 as a parameter for compensating for pathloss (PL) and may be a value (in the absence of a base station, a preconfigured value) configured through system information or RRC from the base station. For example, for $\alpha=1$, pathloss may be compensated by 100%, and for $\alpha=0.8$, pathloss may be compensated by 80%. Like $P_0$, the amount of interference caused to or by a nearby channel may differ with a type of an SL channel, such that a required compensation level of the pathloss value may vary with the type of the SL channel. Thus, a used may differ among the PSCCH, the PSSCH, and the PSFCH (i.e., $\alpha_{PSCCH}$, $\alpha_{PSSCH}$, and $\alpha_{PSFCH}$);

M: this may mean a size of a frequency block allocated for transmission of each channel. In FIGS. 7A and 7B, it is shown that the PSCCH uses N1 frequency blocks and the PSSCH uses N2 frequency blocks in a K1-symbol period and M frequency blocks in a K2-symbol period. Thus, according to FIGS. 7A and 7B, M of the PSCCH=N1, and M of the PSSCH in the K1-symbol period=N2, and M of the PSSCH in the K2-symbol period=L. Meanwhile, in FIG. 7, M of the PSFCH=L or an integer less than L (e.g., 1 or 2);

PL: this may mean a pathloss estimation value. In this case, PL may be estimated using [Equation 1]. The pathloss value may be estimated using a signal (e.g., an SL DMRS or an SL CSI-RS) transmitted through an SL or a signal (e.g., a DL synchronization signal or a DL CSI-RS) transmitted through a DL;

$P_{Congestion}$: this may mean a maximum transmission power available to the V2X transmission UE according to a congestion level as a parameter reflecting the congestion level of the V2X transmission UE. More specifically, when the base station determines that a congestion level is high in a resource pool configured by the base station, the base station may transmit $P_{Congestion}$ to the V2X transmission UE through system information or RRC setup. In another example, the V2X transmission UE may have $P_{Congestion}$ configured in unicast link connection setup through PC-5 RRC. In another example, the V2X transmission UE may use $P_{Congestion}$ included in preconfigured resource pool information. $P_{Congestion}$ may have a unit of [dBm], and range from −41 [dBm] to 31 [dBm] by 1 [dBm]. $P_{Congestion}$ may a relationship with a priority of the PSSCH transmitted by the V2X transmission UE. That is, when the priority of the PSSCH transmitted by the V2X transmission UE is high, transmission of the PSCCH and transmission of the corresponding PSSCH have to be successfully performed in spite of a high congestion level, such that $P_{Congestion}$ that is configured by the base station or PC-5 RRC or preconfigured may be large (e.g., 31 [dBm]). On the other hand, when the priority of the PSSCH transmitted by the V2X transmission UE is low and the congestion level is high, there may be no problem in spite of a failure in transmission of the PSCCH and transmission of the corresponding PSSCH (or in spite of abandonment of the transmission), such that PCongestion that is configured by the base station or PC-5 RRC or preconfigured may be small (e.g., −41 [dBm]);

$P_{Range}$: this may mean a transmission power for achieving range requirements in V2X communication. More specifically, range may mean a minimum distance that guarantees a quality of service (QoS) (e.g., a delay time, reliability, a data rate, etc.) of an SL data packet transmitted through unicast or groupcast. In unicast or groupcast V2X communication, the transmission UE may receive information (e.g., range information) about range requirements from its upper layer (e.g., application layer). The range information may be expressed as a distance or an index having a unit of meter (m). That is, the application layer may provide range information (e.g., 100 m) to an AS layer in the unit of a meter. In another example, the application layer may provide a range index to the AS layer. In this case, a minimum distance may be mapped to each range index (i.e., an index 1=100 m, index 2=200 m, etc.). The AS layer having received the range information may generate $P_{Range}$ mapped to the range information. For example, the AS layer may generate $P_{Range}$ corresponding to a range of 100 m (or range index 1) and $P_{Range}$ corresponding to a range of 200 m (or range index 2). In another example, the AS layer having received the range information from the application layer may deliver the corresponding information to RRC and generate $P_{Range}$ in RRC.

To control the transmission power of the PSCCH based on the parameters described above, [Equation 2] may be used.

$$P_{PSCCH}(i) = X1 + \min\{Pc\,\max(i), P_{Congestion}, P_{Range}, 10\log_{10}(X2*2^\mu) + \min\{Q0, Q1\}\} [dBm] \quad \text{Equation 2}$$

The transmission power of the PSSCH may be calculated like in [Equation 2], but the transmission power of the PSSCH may be calculated separately for two parts thereof. The first part may mean the transmission power of the PSSCH corresponding to the K1 symbols in FIGS. 7A and 7B, and may mean a PSSCH transmission power in a symbol in which the PSCCH and the PSSCH are subject to FDM. This may be defined as $P_{PSSCH-1}(i)$. The second part may mean the transmission power of the PSSCH corresponding to the K2 symbols in FIGS. 7A and 7B, and a PSSCH transmission power in a symbol in which the PSCCH and the PSSCH are not subject to FDM. This may be defined as $P_{PSSCH-2}(i)$.

An equation for controlling the transmission power of $P_{PSSCH-1}(i)$ may be defined as [Equation 3].

$$P_{PSSCH-1}(i) = X1 - \varepsilon + \min\{P_{c}\max(i), P_{Congestion}, P_{Range}, 10\log_{10}(X2*2^\mu) + \min\{Q0, Q1\}\} [dBm] \quad \text{Equation 3}$$

An equation for controlling the transmission power of $P_{PSSCH-2}(i)$ may be defined as below. As shown in FIGS. 7A and 7B, when the number of symbols used by one V2X transmission UE for $i^{th}$ PSCCH and PSSCH transmission is (K1+K2), the transmission power of each PSCCH symbol of the (K1+K2) symbols needs to be equal. When the transmission power of each PSSCH symbol is not equal, a guard interval (or GAP) for power transient between symbols in which the transmission power changes is required, causing the inefficiency of resource use. Moreover, when the transmission power level changes between symbols, a phase difference between the symbols changes, degrading a capability of reception of the symbols in a reception end. Thus, the PSSCH transmission power $P_{PSSCH-1}(i)$ in the K1 symbols in which the PSCCH and the PSSCH are subject to FDM and the PSSCH transmission power $P_{PSSCH-2}(i)$ in the K2 symbols in which the PSSCH is transmitted have to be maintained equal to each other. To this end, the transmission power $P_{PSSCH-2}(i)$ for the second part of the PSSCH may be determined using [Equation 4].

$$P_{PSSCH-2}(i)=P_{PSSCH}(i)+P_{PSSCH-1}(i)[\text{dBm}] \quad \text{Equation 4}$$

In [Equation 4], $P_{PSSCH}(i)$ and $P_{PSSCH-1}(i)$ may be determined using [Equation 2] and [Equation 3]. As seen from [Equation 2] and [Equation 3], each of $P_{PSSCH}(i)$ and $P_{PSSCH-1}(i)$ may be less than Pcmax(i) (i.e., $P_{PSSCH}(i)$<Pcmax(i) and <Pcmax(i)). However, $P_{PSSCH-2}(i)$ calculated using [Equation 4] may be greater than Pcmax(i). In this case, $P_{PSSCH-2}(i)$ may be calculated again using [Equation 5] and [Equation 6].

$$P'_{PSSCH-2}(i)=\min\{P\text{cmax}(i),P_{PSSCH-2}(i)\}[\text{dBm}] \quad \text{Equation 5}$$

$$P'_{PSSCH-2}(i)=\delta P_{PSSCH-2}(i)[\text{dBm}] \quad \text{Equation 6}$$

In [Equation 6], $\delta$, which is a scaling factor, may be greater than 0 and less than or equal to 1. The transmission UE may configure $\delta$ to satisfy $P_{PSSCH-2}(i) \leq P\text{cmax}(i)$.

In case of $P_{PSSCH-2}(i)=P\text{cmax}(i)$ based on [Equation 5], this may mean $P_{PSCCH}(i)+P_{PSSCH-1}(i)=P_{PSSCH-2}(i)>P\text{cmax}(i)$ as mentioned above. That is, $P_{PSSCH-2}(i)$ is limited by Pcmax(i) and thus the transmission power of $P_{PSSCH-2}(i)$ is changed into $P_{PSSCH-2}(i)$, such that to use the same transmission power for the K1 symbols and the K2 symbols, the transmission power of $P_{PSCCH}(i)+P_{PSSCH-1}(i)$ needs to be changed. To this end, to satisfy $P_{PSCCH}(i)+P_{PSSCH-1}(i) \leq P\text{cmax}(i)$ by using $\beta[P_{PSSCH}(i)+P_{PSSCH-1}(i)]$, a sum of transmission powers may be scaled down. $\beta$, which is a scaling factor, may be greater than 0 and less than or equal to 1. In another example, the transmission power of $P_{PSSCH-2}(i)$ may be re-distributed at a ratio of the transmission power of $P_{PSCCH}(i)$ and the transmission power of $P_{PSSCH-1}(i)$ to update the transmission power of $P_{PSCCH}(i)$ and the transmission power of $P_{PSSCH-1}(i)$, respectively. That is, when the updated transmission powers of $P_{PSCCH}(i)$ and $P_{PSSCH-1}(i)$ are defined as $P_{PSCCH}(i)$ and $P_{PSSCH-1}(i)$, $P'_{PSCCH}(i)$ and $P'_{PSSCH-1}(i)$ may be calculated based on $P'_{PSCCH}(i)=10\log_{10}[A1*B/(A1+A2)]$ and $P_{PSSCH-1}(i)=10\log_{10}[A2*B/(A1+A2)]$. In this case, $A1=10^{\wedge}[P_{PSCCH}(i)/10]$, $A2=10^{\wedge}[P_{PSSCH-1}(i)/10]$, and $B=10^{\wedge}[P_{PSCCH-2}(i)/10]$.

Likewise, when the transmission power of $P_{PSSCH-2}(i)$ is changed into $P_{PSSCH-2}(i)$ based on [Equation 6], to use the same transmission power for the K1 symbols and the K2 symbols, the transmission power of $P_{PSCCH}(i)+P_{PSSCH-1}(i)$ needs to be changed. To this end, as described above, the sum of the transmission powers of $P_{PSCCH}(i)+P_{PSSCH-1}(i)$ may be scaled down using $\beta[P_{PSSCH}(i)+P_{PSSCH-1}(i)]$ or the changed transmission power of $P_{PSSCH-2}(i)$ may be redistributed at a ratio of the transmission power of $P_{PSCCH}(i)$ and the transmission power of $P_{PSSCH-1}(i)$ to update the transmission power of $P_{PSCCH}(i)$ and the transmission power of $P_{PSSCH-1}(i)$.

To control the transmission power of the PSFCH based on the parameters described above, [Equation 7] may be used.

$$P_{PSFCH}(i)=\min\{P\text{cmax}(i),P_{Congestion},P_{Range},10\log_{10}(M_{PSFCH}*2^{\mu})+\min\{Q0,Q1\}\}[\text{dBm}] \quad \text{Equation 7}$$

In [Equation 2] and [Equation 3] through [Equation 7], X1, X2, $2^{\mu}$, Q0, and Q1 may mean:

X1:

$$10\log_{10}\left(\frac{10^{\frac{\varepsilon}{10}} \times M_{PSCCH}}{M_{PSSCH} + 10^{\frac{\varepsilon}{10}} \times M_{PSCCH}}\right),$$

in which $M_{PSCCH}$ and $M_{PSSCH}$ may mean a size of a frequency block allocated for transmission of each of the PSCCH and the PSSCH. $\varepsilon$ may be a parameter for power boosting of the PSCCH. For example, when the PSCCH performs power boosting to maintain a PSD higher by 3 dB than the PSSCH, $\varepsilon=3$. When the PSCCH and the PSSCH maintain the same PSD (or when they do not perform power boosting), $\varepsilon=0$. $\varepsilon$ may use a fixed value (i.e., $\varepsilon=3$), or may be configured through system information and RRC of the base station. In the absence of the base station, $\varepsilon$ may be preconfigured. In another example where c is configured, $\varepsilon$ may be configured through PC-5 RRC when the V2X transmission UE and reception UE perform unicast connection setup.

X2:

$$10\log_{10}(M_{PSSCH} + 10^{\frac{\varepsilon}{10}} \times M_{PSCCH}),$$

in which $M_{PSCCH}$, $M_{PSSCH}$, and $\varepsilon$ may be as described above in relation to X1.

$2^{\mu}$: a parameter for compensating for a power spectral density (PSD) that differs with a subcarrier spacing. For example, when a subcarrier spacing of 15 kHz is used, $\mu=0$. When a subcarrier spacing increases by two times to 30 kHz in spite of the use of the same number of frequency blocks, a PSD may be reduced to a half of a case when a subcarrier spacing of 15 kHz is used. Thus, to compensate for this, the power needs to be increased by two times. More specifically, when two frequency blocks are used, for a subcarrier spacing of 15 kHz, a transmission power of $10\log_{10}(2\times 2^0)=3$ dB is required, but for a subcarrier spacing of 30 kHz, the transmission power needs to be increased to $10\log_{10}(2\times 2^1)=6$ dB to maintain the same PSD as that in a subcarrier spacing of 15 kHz.

Q0: a transmission power in the application of a DL pathloss value in which $Q0=P_{0\_DL}+\alpha_{DL}\cdot PL(q)$. In Q0, an index q expressing a pathloss may be omitted. $P_{0\_DL}$ may be expressed as $P_{0\_PSCCH\_DL}$, $P_{0\_PSSCH\_DL}$, and $P_{0\_PSFCH\_DL}$ for the PSCCH, the PSSCH, and the PSFCH, respectively, and a different value may be configured for each channel. Similarly, $\alpha_{DL}$ may be expressed as $\alpha_{PSCCH\_DL}$, $\alpha_{PSSCH\_DL}$, and $\alpha_{PSFCH\_DL}$ for the PSCCH, the PSSCH, and the PSFCH, respectively, and a different value may be configured for each channel.

Q1: a transmission power in the application of an SL pathloss value in which $Q1=P_{0\_PSCCH\_SL}+\alpha_{PSCCH\_SL}\cdot PL(q)$. In Q1, the index q expressing a pathloss may be omitted. $P_{0\_SL}$ may be expressed as $P_{0\_PSCCH\_SL}$, $P_{0\_PSSCH\_SL}$, and $P_{0\_PSFCH\_SL}$ for the PSCCH, the PSSCH, and the PSFCH, respectively, and a different value may be configured for each channel. Similarly, $\alpha_{SL}$ may be expressed as $\alpha_{PSCCH\_SL}$, $\alpha_{PSSCH\_SL}$, and $\alpha_{PSFCH\_SL}$ for the PSCCH, the PSSCH, and the PSFCH, respectively, and a different value may be configured for each channel.

[Equation 2], [Equation 3], [Equation 4], [Equation 5], [Equation 6], and [Equation 7] may be examples when both a DL pathloss value and an SL pathloss value are applied. When a DL pathloss value is applied, min{Q0, Q1}=Q0 in [Equation 2] and [Equation 3] through [Equation 7], and when an SL pathloss value is applied, min{Q0, Q1}=Q1. Whether the V2X transmission UE needs to use a DL pathloss value, whether the V2X transmission UE needs to use an SL pathloss value, or whether the V2X transmission UE needs to use both the DL pathloss value and the SL pathloss value may be determined based on at least one of the following methods:

(1) Method 1: a type of a pathloss estimation signal is configured.

When an SL transmission power needs to be performed using a DL pathloss with a base station, the V2X transmission UE and the V2X reception UE may be configured by the base station to estimate a pathloss by using a DL SSB or CSI-RS (i.e., an SSB or CSI-RS may be configured as a pathloss estimation signal). When an SL transmission power needs to be performed using an SL pathloss between the V2X UEs, the V2X transmission UE and the V2X reception UE may be configured by the base station to estimate a pathloss by using an SL reference signal (e.g., an SL CSI-RS transmitted to the PSSCH or a DMRS transmitted to the PSSCH) (that is, the SL CSI-RS or DMRS may be configured as the pathloss estimation loss).

Information about whether to apply the DL pathloss value to the SL transmission power, whether to apply the UL pathloss value to the SL transmission power, or which pathloss estimation signal having an equivalent meaning thereto has to be used may be included in SL resource pool information. For example, the base station may transmit the SL resource pool information to the UE through system information or RRC setup, and parameters for SL transmission power available in the resource pool may be configured in the SL resource pool information. In this case, the parameters for transmission power may include at least one of $P_{0\_PSCCH}$, $\alpha_{PSCCH}$, or PL(q) mentioned in [Equation 2]. More specifically, PL(0) may mean application of a DL pathloss and may mean estimation of a DL pathloss by using an SSB (q=0). PL(1) may mean application of a DL pathloss and may mean estimation of a DL pathloss by using a DL CSI-RS (q=1). PL(2) may mean application of an SL pathloss and may mean estimation of an SL pathloss by using an SL CSI-RS or an SL DMRS (q=2). In another example, in the resource pool information transmitted through system information or RRC setup, the use of SSB, CSI-RS, SL CSI-RS, or SL DMRS may be explicitly indicated.

In another example, in the absence of the base station, for the V2X transmission UE, SL transmission power parameters may be configured from the preconfigured resource pool information. In this case, the V2X transmission UE may obtain the foregoing transmission power parameters from the preconfigured resource pool information.

In another example, regardless of absence or existence of the base station, the V2X transmission UE may perform PC-5 RRC setup in unicast connection setup with the V2X reception UE. For the V2X transmission UE, SL transmission power parameters may be configured through PC-5 RRC (when SL transmission power parameters are not included in SL resource pool information), or information about an SL resource pool may be configured through PC-5 RRC, and thus SL transmission power parameters may be configured (when the SL transmission power parameters are included in the SL resource pool information).

In [Equation 2], for application of DL pathloss and for application of SL pathloss, $P_0$ and $\alpha$ may be configured as different values. That is, when the UE has to apply DL pathloss, $P_{0\_DL}$=A1 and $\alpha_{DL}$=B1, and when the UE has to apply SL pathloss, $P_{0\_SL}$=A2 and $\alpha_{SL}$=B2. This is because in a scenario where an SL and a Uu link (i.e., a DL and an UL) share frequency with each other, SL transmission power control may be performed to reduce interference caused by SL transmission to an UL signal received by the base station, and thus a DL pathloss value has to be applied. On the other hand, in the scenario where the SL and the Uu link share frequency with each other, an SL pathloss may be applied to reduce power consumption by guaranteeing the quality of an SL and avoiding using an unnecessarily high transmission power.

Meanwhile, when the V2X UE has to apply both a DL pathloss value and an SL pathloss value, SL transmission power parameters corresponding to application of the DL pathloss value and SL transmission power parameters corresponding to application of the SL pathloss value may be configured at the same time. That is, for the V2X UE, $P_{0\_DL}$ and $\alpha_{DL}$ applicable for application of the DL pathloss value and a type of a pathloss estimation value for estimating DL pathloss (SSB or DL CSI-RS) and $P_{0\_SL}$ and $\alpha_{SL}$ applicable for application of the SL pathloss value and a type of a pathloss estimation value for estimating SL pathloss (SL CSI-RS or SL DMRS) may be configured from the base station at the same time through system information or RRC or through PC-5 RRC of the UE.

As described above, SL transmission power parameter information including $P_0$ and a, and a type of a pathloss estimation value for estimating pathloss may be included in resource pool information. More specifically, in the resource pool information, $P_{0\_DL}$ and $\alpha_{DL}$ applicable for application of the DL pathloss value and a type of a pathloss estimation value used for DL pathloss estimation and $P_{0\_SL}$ and $\alpha_{SL}$ applicable for application of the SL pathloss value and a type of a pathloss estimation value used for SL pathloss estimation may be simultaneously configured (i.e., SSB or DL CSI-RS and SL CSI-RS or SL DMRS may be simultaneously configured).

In another example, a pathloss index configured in resource pool information may indicate a type of a pathloss estimation value used for pathloss estimation (e.g., when q=0 means SSB, q=1 means DL CSI-RS, and q=2 means SL CSI-RS or SL DMRS, q=0 and q=2 or q=1 and q=2 may be configured at the same time).

Meanwhile, in [Equation 2], $P_{Congestion}$ may include $-\infty$ (minus infinity). In this case, this means minus infinity in the unit of dBm, and converted in a linear domain into $10^{\wedge}(-\infty/10)=10^{\wedge}(-\infty)=1/(10^{\wedge}\infty)\approx 0$ [mW]. In case of $P_{Congestion}=-\infty$ in [Equation 2], $P_{PSCCH}(i)=P_{Congestion}=-\infty$ [dBm]. As described above, this may mean that a transmission power of a PSCCH in the linear domain may be 0 [mW] (i.e., the PSCCH is not transmitted).

V2X transmission UEs operating in mode 2 resource allocation may perform PSCCH decoding to select a PSCCH resource that may be occupied by them in a configured (or preconfigured) PSCCH resource pool or PSCCH resource domain. In addition, the V2X transmission UE may measure a congestion level of a PSCCH transmitted in each slot in a PSCCH resource pool or a PSCCH resource domain. More specifically, in mode 2 resource allocation, ma congestion level of a PSCCH may be measured based on a ratio (B/A) of the number of total PSCCH resources constituting a PSCCH resource pool (or PSCCH region), B, to the number of PSCCH resources occupied by other UEs, A. In this case, B may be calculated by comparing a received signal strength indicator (RSSI) of PSCCH symbols with an RSSI threshold value configured (or preconfigured) through the base station or PC-5 RRC. Likewise, a congestion level of a PSSCH may be measured based on a ratio (B/A) of the number of total PSSCH resources constituting a PSSCH resource pool (or PSSCH region), B, to the number of PSSCH resources occupied by other UEs, A. In this case, B may be calculated by comparing an RSSI of PSSCH symbols with an RSSI threshold value configured through the base station or PC-5 RRC (or preconfigured).

More specifically, assuming that a PSCCH (or PSSCH) transmitted by each UE in a PSCCH resource pool (or a PSSCH resource pool) includes x symbols, a total received power for each symbol may be obtained (a total of x total received powers) and may be averaged over the x symbols. In this case, an RSSI of a PSCCH (or PSSCH) transmitted by each UE may be measured. The V2X transmission UE may compare the measured RSSI with the RSSI threshold value configured through the base station or PC-5 RRC (or preconfigured), and determine the PSCCH (or PSSCH) is occupied by other UEs when the measured RSSI is greater than the configured RSSI threshold value. Thus, the PSCCH (or PSSCH) may be included in B.

Measurement of a congestion level may be calculated during a particular time period. For example, A and B may be measured for a PSCCH (or PSSCH) resource that exists in a time period of [n−K, n−1] slots in a configured PSCCH (or PSSCH) resource pool. Thus, a congestion level measured in n slots may mean a congestion level of a PSCCH (or a PSSCH) measured for a PSCCH (or PSSCH) existing in the time period of [n−K, n−1] slots. In this case, K may be a fixed value (or a preconfigured value) or may be configured through a base station or PC-5 RRC.

The V2X transmission UE may report the measured congestion level to the base station. Through information about a congestion level reported from the V2X transmission UE, the base station may determine the congestion level in the corresponding resource pool and configure $P_{Congestion}$.

Meanwhile, $P_{Congestion}$ for a PSFCH of [Equation 7] may be equal to a value for reflecting the congestion level of the PSCCH or the PSSCH. The congestion level of the PSCCH (or the PSSCH) may be measured by the V2X transmission UE transmitting the PSCCH or the PSSCH through decoding of SCI transmitted in the PSCCH and an RSRP of DMRS transmitted in the PSCCH/PSSCH. However, a UE transmitting a PSFCH is a V2X reception UE, such that a congestion level of the PSFCH may have to be measured by the V2X reception UE. Whether the V2X reception UE has to measure the congestion level of the PSFCH may vary with a resource allocation method of the PSFCH.

For example, when resource allocation of the PSFCH is explicitly performed by the PSCCH (i.e., the resource allocation information of the PSFCH is included in the SCI transmitted in the PSCCH), the V2X reception UE ma have to measure the congestion level of the PSFCH. The V2X reception UE may report the measured congestion level of the PSFCH, and the base station may configure $P_{Congestion}$ in the resource pool based on the reported congestion level.

In another example, instead of explicitly performing resource allocation of the PSFCH through the PSCCH, the time/frequency resource of the PSFCH may form an implicit relationship with the time/frequency resource of the PSCCH or the PSSCH. In this case, when the V2X reception UE successfully receives the PSCCH and the PSSCH transmitted from the V2X transmission UE, it may mean that the PSFCH transmitted by the V2X reception UE is highly likely to be successfully received in the V2X transmission UE by using a resource implicitly associated with the PSCCH or the PSSCH. Thus, the V2X reception UE transmitting the PSFCH may reuse a parameter for reflecting the congestion level of the PSCCH or the PSSCH without measuring the congestion level of the PSFCH. In other words, the V2X reception UE may use $P_{Congestion}$ value included in the resource pool configuration information of the PSCCH or the PSSCH to [Equation 7] for power transmission control of the PSFCH.

In [Equation 2], [Equation 3], and [Equation 7], in $i^{th}$ PSCCH, PSSCH, or PSFCH transmission, the congestion level for determining $P_{Congestion}$ configured through the base station or PC-5 RRC (or preconfigured) needs to be defined regarding a period corresponding to a result of the measured congestion level. For example, the base station or PC-5 RRC may use a result of the congestion level measured before k1 slots or k2 symbols from the $i^{th}$ PSCCH, PSSCH, or PSFCH transmission of the V2X transmission UE. That is, the congestion level reflected in $P_{Congestion}$ used in calculation of the transmission power of the PSCCH/PSSCH/PSFCH transmitted in an $i^{th}$ slot may mean the congestion level measured in an $(i-k1)^{th}$ slot or the congestion level measured before k2 symbols from the first symbol of the PSCCH/PSSCH/PSFCH transmitted in the $i^{th}$ slot. As mentioned above, the congestion level measured in the $(i-k1)^{th}$ slot may mean the congestion level measured for the PSCCH resource in a time period of [i−k1−K, i−k1−1]. The congestion level measured in a $(i-k2)^{th}$ symbol may mean the congestion level measured for the PSCCH/PSSCH/PSFCH resource existing in a time period of [i−k2−K, i−k2−1].

[Equation 2] may be applied in a mode in which the base station schedules a transmission resource of the V2X transmission UE by using DCI transmitted through the PDCCH.

When $P_{Congestion}$ is not configured from the base station or PC-5 RRC or there is no preconfigured $P_{Congestion}$, $P_{Congestion}$ may be omitted in [Equation 2]. Likewise, when $P_{Range}$ is configured from the base station or PC-5 RRC or there is no preconfigured $P_{Range}$, $P_{Range}$ may be omitted in [Equation 2].

(2) Method 2: $\alpha=0$ is configured.

Unlike in Method 1, for application of a DL pathloss value, a for an SL pathloss value may be configured as 0. That is, a for application of a DL pathloss value may be defined as $\alpha_{DL}$, and a for application of an SL pathloss value may be defined as $\alpha_{SL}$. In this case, for application of a DL pathloss value, $\alpha_{SL}=0$ may be configured, and in [Equation 2], $Q1=P_{0\_PSCCH\_SL}+\alpha_{PSCCH\_SL}*PL(q)=P_{0\_PSCCH\_SL}$, such that $\min\{Q0, Q1\}=\min\{Q0, P_{0\_PSCCH\_SL}\}=Q0$. Meanwhile, for application of an SL pathloss value, $\alpha_{DL}=0$ may be configured, and in this case, $Q0=P_{0\_PSCCH\_DL}+\alpha_{PSCCH\_DL}\cdot PL(q)=P_{0\_PSCCH\_DL}$, such that in [Equation 2], $\min\{Q0, Q1\}=\min\{P_{0\_PSCCH\_DL}, Q1\}=Q1$.

(3) Method 3: $P_0=\infty$ is configured.

$P_0$ for application of the DL pathloss value may be defined as $P_{0\_DL}$, and $P_0$ for application of the SL pathloss value may be defined as $P_{0\_SL}$. In this case, for application of the DL pathloss value, $P_{0\_SL}=\infty$ may be configured, and in [Equation 2], $Q1=P_{0\_PSCCH\_SL}+\alpha_{PSCCH\_SL}*PL(q)=\infty$, such that $\min\{Q0, Q1\}=\min\{Q0, \infty\}=Q0$. In this case, for application of the SL pathloss value, $P_{0\_DL}=\infty$ may be configured, and in [Equation 2], $Q0=P_{0\_PSCCH\_DL}+\alpha_{PSCCH\_DL}*PL(q)=\infty$ such that $\min\{Q0, Q1\}=\min\{\infty, Q1\}=Q1$.

A case where both $P_0=\infty$ and $\alpha=0$ are configured by the foregoing combination would not be excluded.

Figure 8:
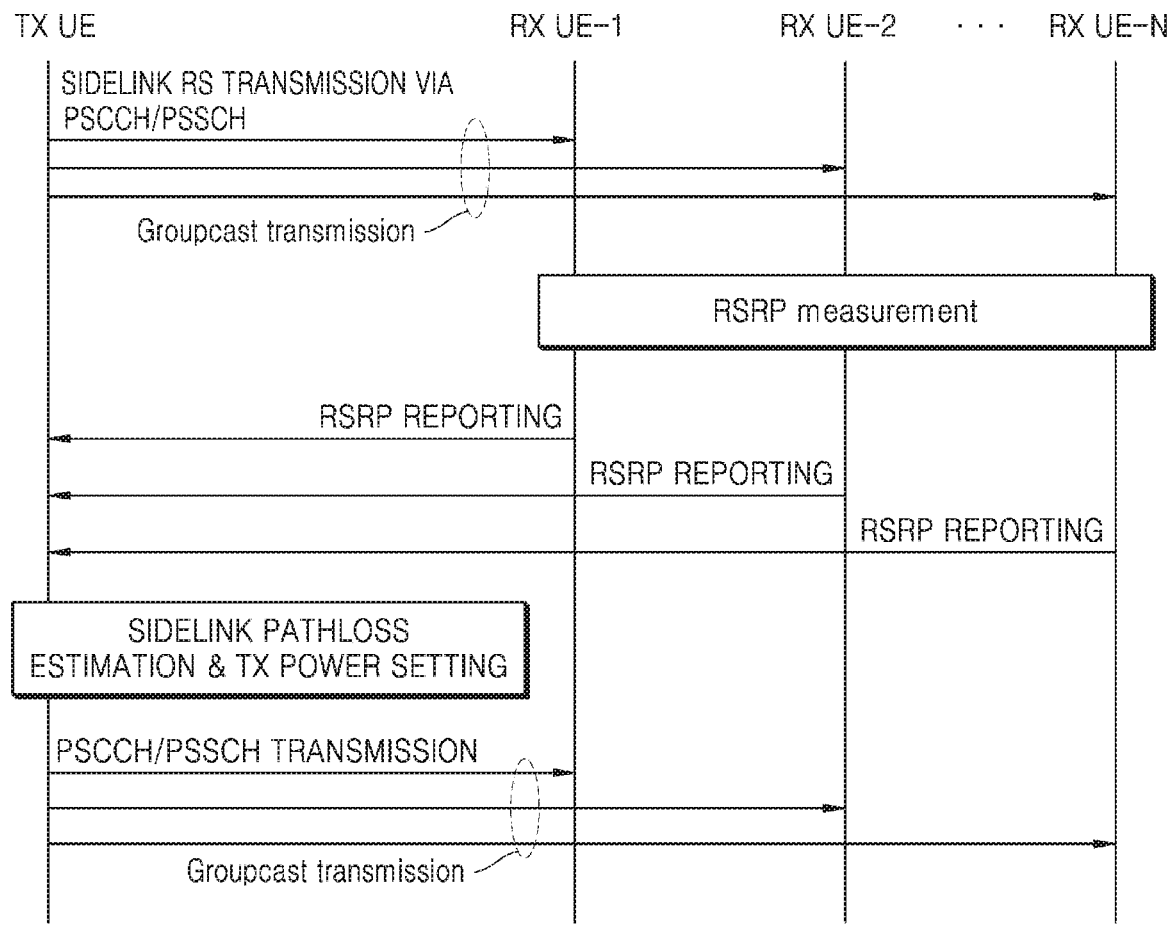
FIG. 8 is a view for describing a method for estimating sidelink pathloss in V2X groupcast communication, according to an embodiment of the disclosure.

FIG. 8 is a view for describing a method for estimating sidelink pathloss in V2X groupcast communication, according to an embodiment of the disclosure.

UEs illustrated in FIG. 8 may perform groupcast communication the same group, and a V2X transmission (TX) UE may transmit an SL pathloss estimation signal to a reception (RX) UE-1, and an RX UE-2 through an RX UE-N by using a groupcast method. In this case, the V2X TX UE may transmit the SL pathloss estimation signal to RX UEs by using a time to transmit the pathloss estimation signal or one of conditions, illustrated in FIG. 6. For example, the V2X TX UE may be configured to apply an SL pathloss value to SL transmission power control through system information or RRC of the base station. Such configuration information may be included in resource pool information. The V2X TX UE configured to perform SL transmission power control using the SL pathloss value may transmit the pathloss estimation signal together with SL data in transmission of the SL data. The SL pathloss estimation signal may be transmitted in a PSSCH bandwidth in which the SL data is transmitted. When there is no SL data to be transmitted by the V2X TX UE, the V2X TX UE may not transmit the pathloss estimation signal.

The RX UE-1, and the RX UE-2 through the RX UE-N having received the pathloss estimation signal from the V2X TX UE may measure RSRPs by using the received pathloss estimation signal. The V2X RX UE-1, and the V2X RX UE-2 through the V2X RX UE-N may report the measured RSRPs to the V2X TX UE. In this case, all the RX UE-1, and the RX UE-2 through the RX UE-N having received the pathloss estimation signals may report the RSRP value or some of the RX UE-1, and the RX UE-2 through the RX UE-N having received the pathloss estimation signals may report the RSRP value. When only some of the RX UE-1, and the RX UE-2 through the RX UE-N report the RSRP values, the RX UE-1, and the RX UE-2 through the RX UE-N may compare obtained RSRP threshold value information with their measured RSRP values to determine whether to report the RSRP values. For example, for the V2X RX UE-1, and the V2X RX UE-2 through the V2X RX UE-N, an RSRP threshold value may be configured through the base station or PC-5 RRC or may be obtained by decoding SCI transmitted from the V2X TX UE. The RSRP values reported from the V2X RX UE-1, the V2X RX UE-2 through the V2X RX UE-N to the V2X TX UE may be transmitted to the PSSCH or the PSFCH through PC-5 RRC or MAC-CE. In another example, when SL data to be transmitted from the V2X RX UE-1, the V2X RX UE-2 through the V2X RX UE-N to the V2X TX UE is generated, the V2X RX UE-1, the V2X RX UE-2 through the V2X RX UE-N may piggyback the RSRP values to the SL data for transmission. In another example, when SL data to be transmitted from the V2X RX UE-1, and the V2X RX UE-2 through the V2X RX UE-N to the V2X TX UE is not generated, the V2X RX UE-1, and the V2X RX UE-2 through the V2X RX UE-N may transmit the RSRP values through the PSSCH. According to whether the RSRP values reported from the V2X RX UE-1, and the V2X RX UE-2 through the V2X RX UE-N to the V2X TX UE are L1-RSRP or L3-RSRP, a method for SL pathloss estimation performed by the V2X TX UE may differ as will be described in detail with reference to FIGS. 9 and 10.

The V2X TX UE may estimate an SL pathloss value through one of methods to be described with reference to FIGS. 9 and 10 by using L1-RSRP or L3-RSRP received from all or some of the RX UE-1, and the RX UE-2 through the RX UE-N. The V2X TX UE may configure transmission power values of the PSCCH and the PSSCH by reflecting the estimated pathloss value and transmit the PSCCH and the PSSCH to the RX UE-1, and the RX UE-2 through the RX UE-N through groupcast communication.

Although the base station is not shown in FIG. 8, the TX UE, and the RX UE-1, and the RX UE-2 through the RX UE-N in a coverage of the base station may perform DL synchronization and obtain system information with the base station as shown in FIG. 6. In this case, DL synchronization may be performed through a primary synchronization signal (PSS)/secondary synchronization signal (SSS) received from the base station or a synchronization signal received from a global navigation satellite system (GNSS). The V2X UEs having performed DL synchronization may obtain system information related to V2X through a V2X dedicated system information block (SIB) transmitted from the base station. The V2X UEs in the coverage may perform UL synchronization through a random-access procedure with the base station and perform an RRC connection procedure. The UL synchronization and the RRC connection procedure may be performed by either the transmission UE or the reception UE or both of them.

Although not shown in FIG. 8, each UE pair of FIG. 8 may have completed unicast link setup as mentioned with reference to FIG. 3. That is, it may be assumed that unicast link setup between the V2X TX UE and the RX UE-1, unicast setup between the V2X TX UE and the RX UE-2, unicast setup between the V2X TX UE and the RX UE-N, etc., may has been completed. Such unicast link setup may be performed before or after UL synchronization and RRC connection setup with the base station.

Figure 9:
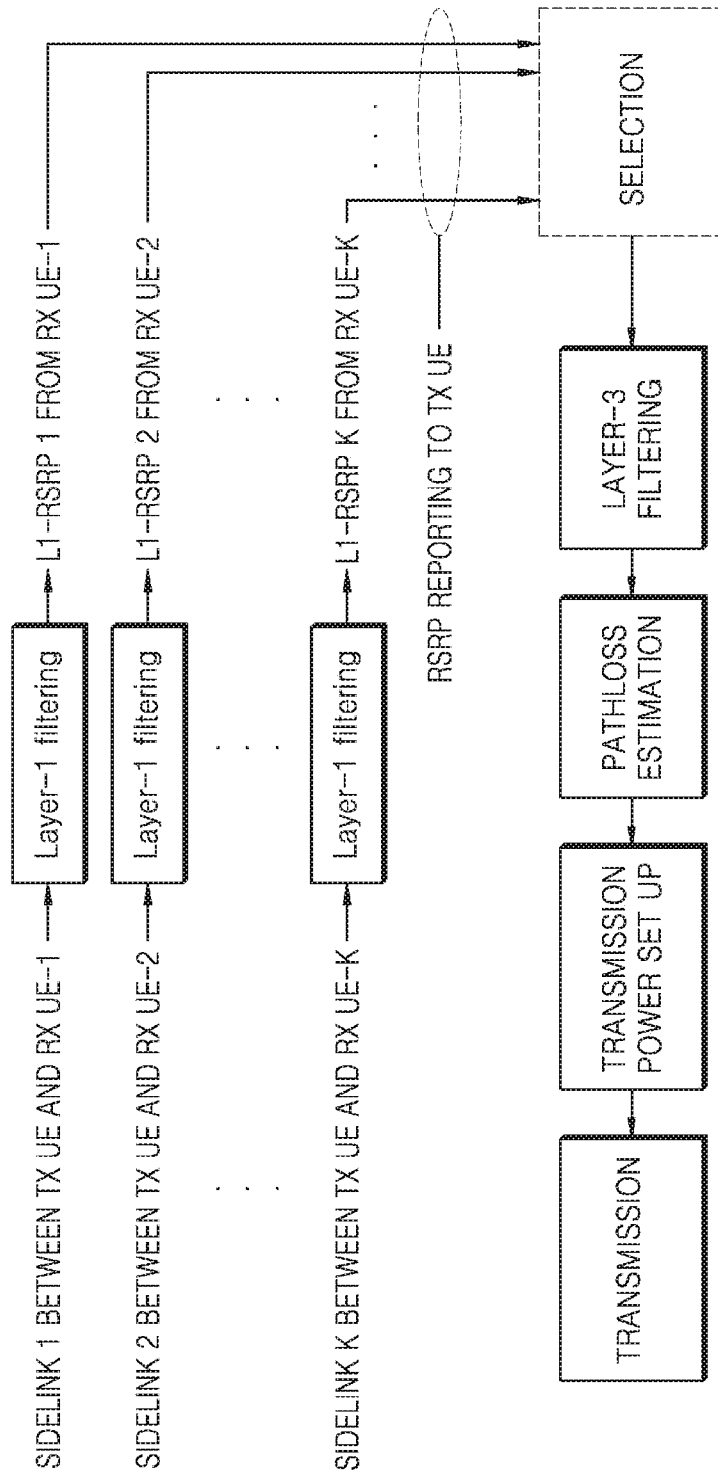
FIG. 9 is a view for describing a method for estimating sidelink pathloss in V2X groupcast communication, according to an embodiment of the disclosure.

FIG. 9 is a view for describing a method for estimating sidelink pathloss in V2X groupcast communication, according to an embodiment of the disclosure.

Referring to FIG. 9, an SL between a TX UE and an RX UE-X may be defined as an SL X, L1-RSRP for the SL X may be defined as L1-RSRP X, and $X \in \{1, 2, \ldots, N\}$. As mentioned with reference to FIG. 8, the V2X TX UE may transmit an SL pathloss estimation signal to RX UEs in a group by using a groupcast scheme. The RX UEs having received the SL pathloss estimation signal from the TX UE may measure L1-RSRP through layer-1 filtering. In this case, all RX UEs having received the SL pathloss estimation signal from the TX UE may report L1-RSRP values measured by them to the TX UE. In another example, among all of the RX UEs having received the SL pathloss estimation signal from the TX UE, RX UEs having satisfied a particular condition may report L1-RSRP values measured by them to the TX UE. As a detailed example for the particular condition, each RX UE may compare its measured L1-RSRP value with a threshold value for L1-RSRP and may not report the measured L1-RSRP when the measured L1-RSRP is less than or less than or equal to the threshold value. This is because when the quality of a particular link is very low, the performance of groupcast communication may degrade. Thus, a link of a quality that is less than or equal to a threshold value (i.e., a low-quality link) needs to be excluded. The threshold value for L1-RSRP may be configured through the base station or PC-5 RRC or may be preconfigured. In this case, L1-RSRP threshold value information may be included in resource pool information. In another example, SCI information transmitted by the V2X TX UE may include the L1-RSRP threshold value.

In another example of the particular condition, each RX UE may measure the congestion level of the SL formed with the TX UE by using a method illustrated in FIGS. 7A and 7B. In this way, when the measured congestion level is greater than or greater than or equal to a threshold value for the configured congestion level, the RX UE may not report the measured L1-RSRP value. This is because when the congestion level is high, the additional increase of the congestion level may be prevented by avoiding reporting the L1-RSRP value. In this case, each RX UE may obtain the threshold value for the congestion level in the same manner as the L1-RSRP threshold value.

FIG. 9 illustrates a case where K RX UEs among N RX UEs in a group report L1-RSRP to a TX UE. In this case, N≥K. That is, when all of the N RX UEs satisfy a condition for L1-RSRP comparison, N=K. Otherwise, N>K.

A TX UE having received a report of L1-RSRP from all of the N RX UEs or a report of L1-RSRP from the K RX UEs in the group may perform a selection operation illustrated in FIG. 9 from the reported L1-RSRP. In this case, the selection operation may be the same as L1-RSRP comparison preformed in the RX UE. That is, the TX UE may sort a candidate group for which layer-3 filtering needs to be performed, by comparing the L1-RSRP value reported from the RX UE with the L1-RSRP threshold value. When the RX UE performs an operation of determining whether to report L1-RSRP (i.e., an operation of determining whether to report L1-RSRP by comparing L1-RSRP with the L1-RSRP threshold value), the operation of sorting the candidate group in the TX UE may be omitted. Alternatively, when the RX UE does not perform the operation of determining whether to report L1-RSRP, the TX UE may perform the operation of sorting the candidate group. In another example, the RX UE may perform the operation of determining whether to report L1-RSRP, and at the same time, the TX UE may perform the operation of sorting the candidate group. In another example, the RX UE may not perform the operation of determining whether to report L1-RSRP, and the TX UE may not perform the operation of sorting the candidate group.

The TX UE may perform layer-3 filtering by using F L1-RSRP values reported from the RX UE. In this case, F≥K≥N, in which F may mean the number of L1-RSRP values for performing layer-3 filtering, K may mean the number of RX UEs reporting L1-RSRP, and N may mean the number of RX UEs in a group. There may be methods as below according to a way to perform layer-3 filtering by the TX UE.

Method 1) Perform Time Domain Layer-3 Filtering on L1-RSRP

The TX UE may perform layer-3 filtering to each L1-RSRP value by using F L1-RSRP values reported from the RX UE. That is, F L3-RSRP values may be derived through F L1-RSRP values. Assuming F=K=N for convenience of a description, the N RX UEs in the group may report the L1-RSRP values measured by them to the TX UE which may then receive the N L1-RSRP values reported from the RX UE. The TX UE may perform layer-3 filtering with respect to each of the N L1-RSRP values and obtain N L3-RSRP values.

The L3-RSRP values obtained from the TX UE may be RSRP values obtained in layer-3 by averaging L1-RSRP values reported from the RX UE for a particular time (e.g., 100 ms), such that a filter coefficient for obtaining an average in layer-3 may be required. When L1-RSRP is averaged, the filter coefficient may be a parameter for determining a weight value between an L1-RSRP value measured past and an L1-RSRP value measured currently. Information about the filter coefficient may use a filter coefficient that is configured from the base station or PC-5 RRC or that is preconfigured.

The TX UE may estimate an SL pathloss value through the obtained L3-RSRP values. For accurate pathloss estimation, the foregoing layer-3 filtering operation needs to be performed for a sufficiently long time (i.e., an average has to be obtained using sufficiently many L1-RSRP samples). To this end, each reception UE may have to report the L1-RSRP value to the transmission UE several times. In an example where N RX UEs report N L1-RSRP values to a TX UE, each RX UE may have to report L1-RSRP to the TX UE Y times. That is, a total of Y x N L1-RSRP values may be received in the TX UE from the N RX UEs. Y may be configured from the base station or PC-5 RRC (or may be preconfigured), and Y may vary with an SL.

The L1-RSRP value may be reported to the TX UE through a PSFCH or a PSSCH. Thus, when each reception UE reports the L1-RSRP value to the transmission UE several times, it may mean that each reception UE has to transmit the PSFCH or the PSSCH to the transmission UE several times. The V2X UE may not be able to perform transmission and reception at the same time, such that when each reception UE transmits the PSFCH or the PSSCH several times, the reception UE may not be able to receive SL control information and data information that may be transmitted from another transmission UE. The V2X UE may not be able to transmit two or more different channels at the same time in one carrier (i.e., two or more different channels may not be frequency-multiplexed and transmitted in one carrier). Thus, when each reception UE transmits the PSFCH or the PSSCH to the transmission UE several times to report L1-RSRP, each reception UE may not be able to transmit SL control information and data information to another UE.

When an RX UE reports L1-RSRP to a TX UE, other problems may occur as below. Agreement may be required between the transmission UE and the reception UE such that the transmission UE receives the L1-RSRP transmitted from the reception UE to perform L3 filtering. More specifically, the transmission UE may expect report of L1-RSRP from the reception UE every [x1] ms or every [x2] slots/symbols. However, when there is no PSFCH or PSSCH resource for reporting L1-RSRP or serious congestion occurs in spite of existence of the PSFCH or PSSCH resource, at the time when the reception UE reports L1-RSRP, the RX UE may not be able to report L1-RSRP to the transmission UE. Thus, in order for the transmission UE to perform L3 filtering by using L1-RSRP reported from the reception UE, a sufficiently long reception window time needs to be secured. That is, when the transmission UE expects that L1-RSRP is to be reported from the reception UE every [x1] ms or every [x2] slots/symbols, the transmission UE may attempt reception of L1-RSRP during+$\Delta 1$ ms or $-\Delta 1$ ms from [x1] ms or attempt reception of L1-RSRP during+$\Delta 2$ ms or $-\Delta 2$ ms from a [x2] slot.

Also, to perform layer-3 filtering, the transmission UE may have to perform filtering during a total of [x4] ms or a total of [x3] L1-RSRP values reported from each RX UE every [x1] ms or every [x2] slots/symbols. Thus, each reception UE may have to continuously perform transmission to the transmission UE until the number of LS-RSRP values reported every [x1] ms or every [x2] slots/symbols is a total of [x3] (in FIG. 9, the total number of L1-RSRP values reported from the RX UE to the TX UE is indicated as K). Thus, the reception UE may have to continuously transmit L1-RSRP reported every [x1] ms or every [x2] slots/symbols up to a total of [x4] ms. In another example, although not shown in FIG. 9, the transmission UE may command stop of reporting of the L1-RSRP to the reception UE. The reception UE may report the L1-RSRP value every [x1] ms or every [x2] slots/symbols until the reception UE receives the command for stopping reporting of the L1-RSRP from the transmission UE.

[x1], [x2], [x3], [x4], Δ1, Δ2, and at least one of filtering coefficients for performing layer-3 filtering may be configured by the base station through system information or RRC signaling. In another example, the transmission UE and the reception UE may perform PC-5 RRC connection setup in unicast link connection setup, and in this case, through PC-5 RRC signaling. In another example, the parameters may be fixed values, which may mean values embedded or preconfigured in the transmission UE and the reception UE.

In Method 1), the TX UE having derived N L3-RSRP values may estimate N SL pathloss values using [Equation 1]. That is, the TX UE may obtain an SL pathloss value-X, $PL_X$ from L3-RSRP X with the RX UE-X. In this case, $X \in \{1, 2, \ldots, N\}$. The TX UE may configure a transmission power value of a PSCCH or a PSSCH by using the obtained pathloss values in [Equation 2], [Equation 3], [Equation 4], [Equation 5], or [Equation 6] and a corresponding channel may be transmitted to the RX UE using groupcast communication. However, [Equation 2] and [Equation 3] are power transmission control methods applied to unicast communication, such that in [Equation 2] and [Equation 3], Q1 is a parameter considering one SL. Thus, to apply [Equation 2] and [Equation 3] to Method 1), Q1 in [Equation 2] may be obtained by considering N SL pathloss values as described above, based on $Q1=\min\{P_{0\_PSCCH\_SL\text{-}1}+\alpha_{PSCCH\_SL\text{-}1}*PL_1(q), P_{0\_PSCCH\_SL\text{-}2}+\alpha_{PSCCH\_SL\text{-}2}*PL_2(q), \ldots, P_{0\_PSCCH\_SL\text{-}N}+\alpha_{PSCCH\_SL\text{-}N}*PL_N(q)\}$. In this case, $P_{0\_PSCCH\_SL\text{-}X}$ and $\alpha_{PSCCH\_SL\text{-}X}$ may mean $P_{0\_PSCCH}$ and $\alpha_{PSCCH}$ that are configured respectively for PSCCH transmission power control of each SL X. $PL_X(q)$ may mean a pathloss value of the SL X estimated from L3-RSRP of the SL X obtained by the TX UE from L1-RSRP of the SL X reported from the RX UE X. Likewise, Q1 in [Equation 3] may be obtained by considering N SL pathloss values as described above, based on $Q1=\min\{P_{0\_PSSCH\_SL\text{-}1}+\alpha_{PSSCH\_SL\text{-}1}*PL_1(q), P_{0\_PSSCH\_SL\text{-}2}+\alpha_{PSSCH\_SL\text{-}2}*PL_2(q), \ldots, P_{0\_PSSCH\_SL\text{-}N}+\alpha_{PSSCH\_SL\text{-}N}*PL_N(q)\}$. In this case, $P_{0\_PSSCH\_SL\text{-}X}$ and $\alpha_{PSCCH\_SL\text{-}X}$ may mean $P_{0\_PSSCH}$ and $\alpha_{PSSCH}$ that are configured respectively for the first part PSCCH transmission power control of each SL X. $PL_X(q)$ may mean a pathloss value of the SL X estimated from L3-RSRP of the SL X obtained by the TX UE from L1-RSRP of the SL X reported from the RX UE X. In $PL_X(q)$, an index 'q' may be omitted.

In the foregoing description, it is assumed that $P_{0\_PSCCH\_SL}$, $P_{0\_PSSCH\_SL}$, $\alpha_{PSCCH\_SL}$, and $\alpha_{PSSCH\_SL}$ use different values for each SL (i.e., $P_{0\_PSCCH\_SL\text{-}X}$, $P_{0\_PSSCH\_SL\text{-}X}$, $\alpha_{PSCCH\_SL\text{-}X}$, $\alpha_{PSSCH\_SL\text{-}X}$). This is because unicast link setup is assumed to be completed by the V2X TX UE and each RX UE before groupcast communication. However, the V2X TX UE and each RX UE may not complete unicast link setup before groupcast communication or perform groupcast communication without unicast link setup. In this case, $P_{0\_PSCCH\_SL}$, $P_{0\_PSSCH\_SL}$, $\alpha_{PSCCH\_SL}$, and $\alpha_{PSSCH\_SL}$ may not be different for each SL for which a unicast link is set up. That is, one (or identical) $P_{0\_PSCCH\_SL}$, $P_{0\_PSSCH\_SL}$, $\alpha_{PSCCH\_SL}$, and $\alpha_{PSSCH\_SL}$ may be configured in a group performing groupcast. For example, resource pool configuration information used by group members performing groupcast may include $P_{0\_PSCCH\_SL}$, $P_{0\_PSSCH\_SL}$, $\alpha_{PSCCH\_SL}$, and $\alpha_{PSSCH\_SL}$. In this case, Q1 for the PSCCH may be defined as below.

$Q1=\min\{P_{0\_PSCCH\_SL}+\alpha_{PSCCH\_SL}*PL_1(q), P_{0\_PSCCH\_SL}+\alpha_{PSCCH\_SL}*PL_2(q), \ldots, P_{0\_PSCCH\_SL}+\alpha_{PSCCH\_SL}*PL_N(q)\} = P_{0\_PSCCH\_SL}+\min\{\alpha_{PSCCH\_SL}*PL_1(q), \alpha_{PSCCH\_SL}*PL_2(q), \ldots, \alpha_{PSCCH\_SL}*PL_N(q)\} = P_{0\_PSCCH\_SL}+\alpha_{PSCCH\_SL}*\min\{PL_1(q), PL_2(q), \ldots, PL_N(q)\}$. Likewise, Q1 for the PSCCH of the first part may be defined as below. $Q1=\min\{P_{0\_PSSCH\_SL}+\alpha_{PSSCH}SL*PL_1(q), P_{0\_PSSCH\_SL}+\alpha_{PSSCH}SL*PL_2(q), \ldots, P_{0\_PSSCH\_SL}+\alpha_{PSSCH}SL*PL_N(q)\} = P_{0\_PSSCH\_SL}+\min\{\alpha_{PSSCH\_SL}*PL_1(q), \alpha_{PSSCH\_SL}*PL_2(q), \ldots, \alpha_{PSSCH\_SL}*PL_N(q)\} = P_{0\_PSSCH\_SL}+\alpha_{PSSCH\_SL}*\min\{PL_1(q), PL_2(q), \ldots, PL_N(q)\}$. In $PL_X(q)$, an index 'q' may be omitted.

Meanwhile, the V2X TX UE and the RX UEs shown in the flowchart of FIG. 8 perform SL groupcast communication in the same group such that the roles of the TX UE and the RX UE may be changed. That is, in FIG. 8, the RX UE-1 may be a new TX UE and the TX UE may be an RX UE (RX UE-1'). Thus, the RX UE-1' having changed a role from the TX UE to the RX UE may receive a PSCCH and a PSSCH from a new TX UE. The RX UE-1' may transmit HARQ-ACK/NACK information of the received PSSCH to the new TX UE through a PSFCH. In this case, the RX UE-1', which has been the TX UE, may transmit the PSFCH by using an SL pathloss value formed between the RX UE-1' and the new TX UE. In groupcast communication, the PSFCH is transmitted from each RX UE to the TX UE, and PSFCH transmission may be similar with unicast communication. Thus, the RX UE-1' may configure the transmission power of the PSFCH using [Equation 7] and transmit the PSFCH to the new TX UE. To this end, when use of the PSFCH (or use of HARQ-ACK) is configured or activated in groupcast communication, the TX UE using Method 1) needs to each SL pathloss value in a memory before a group becomes extinct or a member of the group changes or until use of the PSFCH (or use of HARQ-ACK) is deactivated.

When the operation of comparison with the L1-RSRP threshold value in the RX UE or the operation of sorting a candidate group for performing layer-3 filtering in the TX UE is included, N=K or N=F.

Method 2) Perform Spatial Domain Layer-3 Filtering on L1-RSRP

To solve a problem occurring when each RX UE transmits L1-RSRP several times in Method 1), Method 2) may be considered. In Method 2), unlike in Method 1), layer-3 filtering performed in the TX UE may be performed in the spatial domain instead of in the time domain. More specifically, by averaging N L1-RSRP values transmitted from N RX UEs in the spatial domain, one L3-RSRP value may be derived. In this way, each RX UE may reduce the number of times the L1-RSRP value is reported (for example, each RX UE may report L1-RSRP at least once).

The TX UE having derived one L3-RSRP value using Method 2) may estimate one SL pathloss value by using [Equation 1]. The TX UE may configure a transmission power value of a PSCCH or a PSSCH of the first part by using the obtained pathloss values in [Equation 2], [Equation 3], [Equation 4], [Equation 5], or [Equation 6] and a corresponding channel may be transmitted to the RX UE using groupcast communication. One pathloss value may be estimated for N SLs when Method 2) is used, such that [Equation 2] and [Equation 3], which are transmission power control methods applied to unicast communication, may be reused.

However, when unicast connection setup is completed in groupcast communication using Method 2), different $P_{0\_PSCCH\_SL}$, $P_{0\_PSSCH\_SL}$, $\alpha_{PSCCH\_SL}$, and $\alpha_{PSSCH\_SL}$ may be configured for each SL as mentioned above (i.e., $P_{0\_PSCCH\_SL-X}$, $P_{0\_PSSCH\_SL-X}$, $\alpha_{PSCCH\_SL-X}$, $\alpha_{PSSCH\_SL-X}$). In this case, it is necessary to determine a value to be applied by the TX UE. For example, in PSCCH transmission, the TX UE may apply an arbitrary value among two or more configured pairs of $\{P_{0\_PSCCHH\_SL-X}, \alpha_{PSCCH\_SL-X}\}$ according to UE implementation. In another example, among two or more configured pairs $\{P_{0\_PSCCH\_SL-X}, \alpha_{PSCCH\_SL-X}\}$, the pair $\{P_{0\_PSCCH\_SL-X}, \alpha_{PSCCH\_SL-X}\}$ having the least $P_{0\_PSCCH\_SL-X}$ or the greatest $P_{0\_PSCCH\_SL-X}$ may be applied. In another example, among two or more configured pairs $\{P_{0\_PSCCH\_SL-X}, \alpha_{PSCCH\_SL-X}\}$, the pair $\{P_{0\_PSCCH\_SL-X}, \alpha_{PSCCH\_SL-X}\}$ having the least $\alpha_{PSCCH\_SL-X}$ or the greatest $\alpha_{PSCCH\_SL-X}$ may be applied. In another example, an average for the configured value $P_{0\_PSCCH\_SL-X}$ may be obtained to calculate $P_{0\_PSCCH\_SL}$ and an average for the configured value $\alpha_{PSCCH\_SL-X}$ may be obtained to calculate $\alpha_{PSCCH\_SL}$, such that $P_{0\_PSCCH\_SL}$ and $\alpha_{PSCCH\_SL}$ may be applied to Q1. Various examples mentioned above may be applied to transmission power control for PSSCH transmission of the first part.

Meanwhile, the V2X TX UE and each RX UE may not complete unicast link setup before groupcast communication or perform groupcast communication without unicast link setup. In this case, [Equation 2] and [Equation 3] may be reused without changing Q1.

The operation of comparison with the L3-RSRP threshold value in the RX UE or the operation of sorting a candidate group for performing layer-3 filtering in the TX UE may also be included in Method 2).

Meanwhile, as mentioned in Method 1), roles of the V2X TX UE and the RX UEs performing groupcast communication in the same group may be changed. Thus, the RX UE-1', which has been the TX UE in Method 2), may configure the transmission power of the PSFCH using [Equation 7] and transmit the PSFCH to the new TX UE. That is, when use of the PSFCH (or use of HARQ-ACK) is configured or activated in groupcast communication, the TX UE using Method 2) needs to each SL pathloss value in a memory before a group becomes extinct or a member of the group changes or until use of the PSFCH (or use of HARQ-ACK) is deactivated.

Method 3) Perform Time Domain and Spatial Domain Layer-3 Filtering on L1-RSRP

Method 3) may include a combination of Method 1) and Method 2). That is, each RX UE may measure L1-RSRP and report the measured L1-RSRP to the TX UE at least twice, and the RX UE having received the L1-RSRP may perform time domain layer-3 filtering using the L1-RSRP received from each RX UE (Method 1), and then perform layer-3 filtering on the result again in the spatial domain, thus obtaining one pathloss value (Method 2). In this way, transmission power control of the PSCCH, the PSSCH, and the PSFCH mentioned in Method 2) may be performed.

In another example of Method 3), Method 2) may be performed first and then Method 1) may be performed next. That is, each RX UE may measure L1-RSRP and report the measured L1-RSRP to the TX UE, and the RX UE having received the L1-RSRP may perform spatial domain layer-3 filtering using the L1-RSRP received from each RX UE (Method 2). The TX UE may perform spatial domain layer-3 filtering by using the second L1-RSRP value reported to each RX UE. Likewise, the TX UE may perform spatial domain layer-3 filtering by using $[x]^{th}$ L1-RSRP values reported to the respective RX UEs. The TX UE may perform layer-3 filtering again in the time domain on the L3-RSRP result to which [x] spatial axis layer-3 filtering is applied, thus obtaining one pathloss value (Method 1). In this way, transmission power control of the PSCCH, the PSSCH, and the PSFCH mentioned in Method 2) may be performed.

Figure 10:
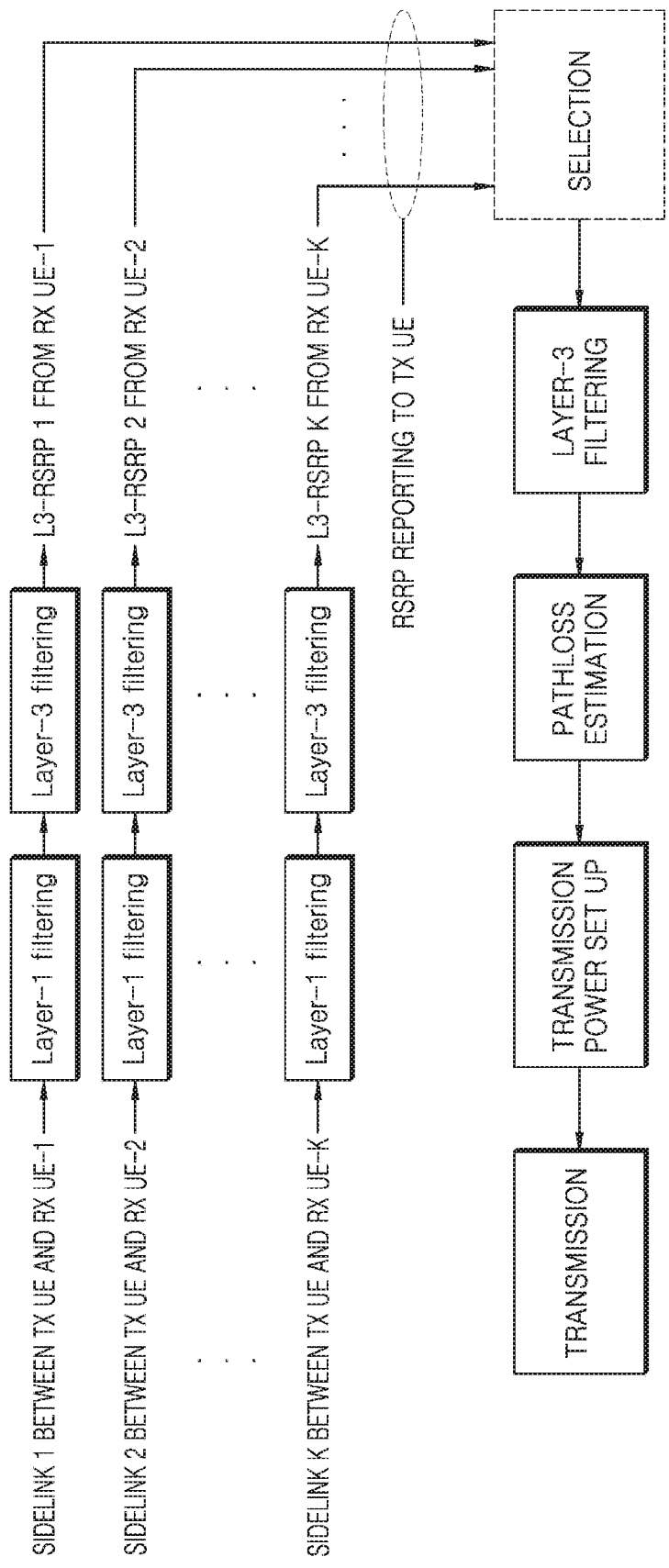
FIG. 10 is a view for describing a method for estimating sidelink pathloss in V2X groupcast communication, according to an embodiment of the disclosure.

FIG. 10 is a view for describing a method for estimating sidelink pathloss in V2X groupcast communication, according to an embodiment of the disclosure.

Referring to FIG. 10, an SL between a TX UE and an RX UE-X may be defined as an SL X, L3-RSRP for the SL X may be defined as L3-RSRP X, and X E $\{1, 2, \ldots, N\}$. In FIG. 9, the TX UE may derive L3-RSRP by using L1-RSRP reported from the RX UE. Unlike in FIG. 9, in FIG. 10, respective RX UEs perform layer-3 filtering by using L1-RSRP measured by them and measure L3-RSRP based on layer-3 filtering. That is, as mentioned in FIG. 8, the respective RX UEs having received the SL pathloss estimation signal from the V2X TX UE in a groupcast manner may measure L3-RSRP through layer-3 filtering. The RX UEs may also report L3-RSRP measured by them to the V2X TX UE. In another example, among all of the RX UEs having received the SL pathloss estimation signal from the TX UE, RX UEs having satisfied a particular condition may report L3-RSRP values measured by them to the TX UE. More specifically, each RX UE may compare its measured L3-RSRP value with a threshold value for L3-RSRP and may not report the measured L3-RSRP when the measured L3-RSRP is less than or less than or equal to the threshold value. This is because when the quality of a particular link is very low, the performance of groupcast communication may degrade. Thus, a link of a quality that is less than or equal to a threshold value (i.e., a low-quality link) needs to be excluded. The threshold value for L3-RSRP may be configured through the base station or PC-5 RRC or may be preconfigured. In this case, L3-RSRP threshold value information may be included in resource pool information. In another example, SCI information transmitted by the V2X TX UE may include the L1-RSRP threshold value.

FIG. 10 illustrates a case where K RX UEs among N RX UEs in a group report L3-RSRP to a TX UE. In this case, N≥K. That is, when all of the N RX UEs satisfy a condition for L3-RSRP comparison, N=K. Otherwise, N>K.

A TX UE having received a report of L3-RSRP from all of the N RX UEs or a report of L3-RSRP from the K RX UEs in the group may perform a selection operation illustrated in FIG. 10 from the reported L3-RSRP. In this case, the selection operation may be the same as L3-RSRP comparison preformed in the reception end. That is, the TX UE may sort a candidate group for which layer-3 filtering needs to be performed, by comparing the L3-RSRP value reported from the RX UE with the L3-RSRP threshold value. When the RX UE performs an operation of determining whether to report L3-RSRP (i.e., an operation of determining whether to report L3-RSRP by comparing L3-RSRP with the L1-RSRP threshold value), the operation of sorting the candidate group in the TX UE may be omitted. Alternatively, when the RX UE does not perform the operation of determining whether to report L3-RSRP, the TX UE may perform the operation of sorting the candidate group. In another example, the RX UE may perform the operation of determining whether to report L3-RSRP, and at the same time, the TX UE may perform the operation of sorting the candidate group.

In another example, each RX UE may measure the congestion level of the SL formed with the TX UE by using a method illustrated in FIGS. 7A and 7B. In this way, when the measured congestion level is greater than or greater than or equal to a threshold value for the configured congestion level, the RX UE may not report the measured L3-RSRP value. This is because when the congestion level is high, the additional increase of the congestion level may be prevented by avoiding reporting the L3-RSRP value. In this case, each RX UE may obtain the threshold value for the congestion level in the same manner as the L3-RSRP threshold value.

The TX UE may estimate F SL pathloss values by using F L3-RSRP values reported from the RX UE and [Equation 1]. The TX UE may configure a transmission power value of the PSCCH, the PSSCH, and the PSFCH as described in Method 1) of FIG. 9 by using the estimated F SL pathloss values.

In another example, the TX UE may perform additional layer-3 filtering in the spatial domain by using F L3-RSRP values reported from the RX UE. The TX UE may perform spatial domain layer-3 filtering by using the F L3-RSRP values and then one SL pathloss value. The TX UE may configure a transmission power value of the PSCCH, the PSSCH, and the PSFCH as described in Method 2) of FIG. 9 by using the estimated one SL pathloss values.

Figure 11:
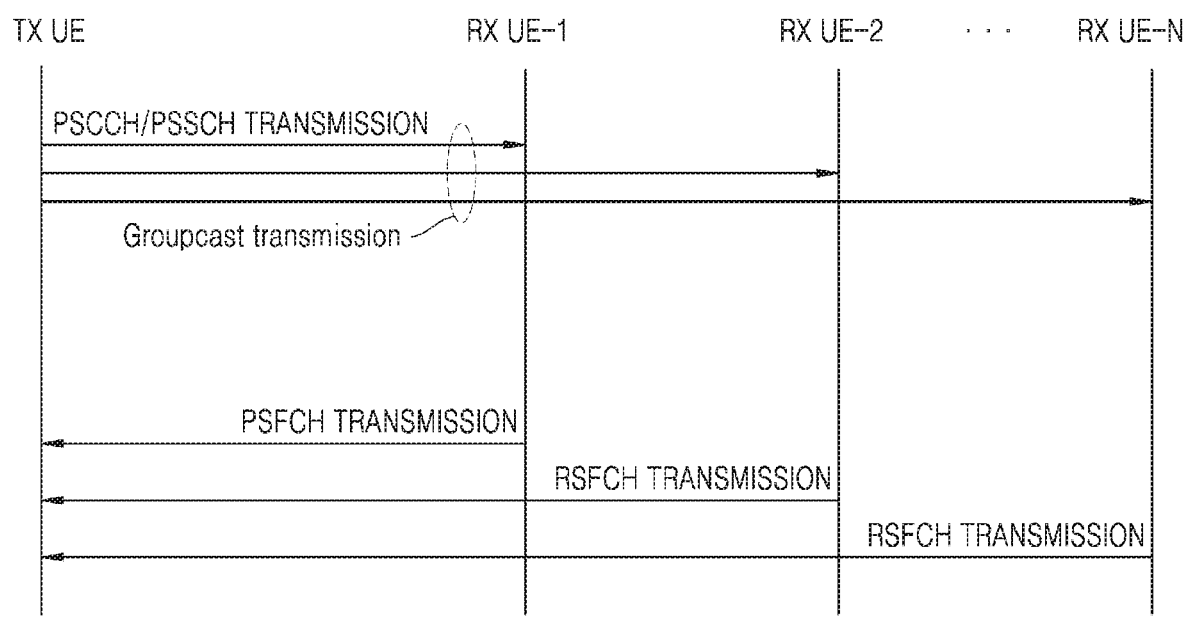
FIG. 11 is a view for describing a V2X groupcast communication procedure, according to an embodiment of the disclosure.

FIG. 11 is a view for describing a V2X groupcast communication procedure, according to an embodiment of the disclosure.

Each RX UE having received SL control information and data information from a TX UE may determine whether the data information has been successfully received and transmit the same to the TX UE through a PSFCH. More specifically, not shown in FIG. 11, UEs (TX UE, RX UE-1, RX UE-N) performing groupcast communication in FIG. 11 may be configured whether to transmit HARQ-ACK/NACK through system information of the base station and RRC. In this case, whether to transmit HARQ-ACK/NACK may be the same as existence or absence of a PSFCH resource. For example, when at least PSFCH time resource information (e.g., a slot index and a period in which the PSFCH resource exists) is included in resource pool information configured through the system information of the base station and RRC, HARQ-ACK/NACK may be used in the resource pool. Otherwise, HARQ-ACK/NACK may not be used in the corresponding resource pool. Whether to transmit HARQ-ACK/NACK or existence or absence of the PSFCH may be configured through PC-5 RRC or may be preconfigured.

As mentioned in FIG. 4, for the RX UEs having been configured to perform HARQ-ACK/NACK transmission or configured with the PSFCH resource, additional information such as a maximum retransmission count, an HARQ-ACK timing, an HARQ-ACK operation method, etc., may be configured. In this case, the HARQ-ACK operation method may mean that the RX UE is to transmit the PSFCH when NACK is generated or to transmit each of an ACK and a NACK through the PSFCH. More specifically, the RX UE having been configured to transmit the NACK through the PSFCH may not transmit the PSFCH when the RX UE has succeeded in decoding of the PSSCH transmitted from the TX UE. The RX UE having been configured to transmit each of the ACK and the NACK through the PSFCH may transmit the ACK in case of a success in decoding of the PSSCH and the NACK in case of a failure in decoding of the PSSCH, through the PSFCH.

A time resource of the PSFCH transmitted by each RX UE may be included in resource pool configuration information. Information about frequency and code resources of the PSFCH may be obtained by each RX UE through a slot index of a PSCCH or a PSSCH transmitted by the TX UE, a frequency block index (or a sub-channel index), etc. Each RX UE may transmit ACK/NACK information to the TX UE according to an HARQ-ACK operation method by using time/frequency/code resource information of the PSFCH obtained by the RX UE. In this case, transmission power control for transmission of the PSFCH may be performed using one of methods described below.

Method 1) PSFCH Transmission Power Control Based on SL Pathloss Estimation

In an example of PSFCH transmission power control based on SL pathloss estimation, as mentioned in [Equation 1], a transmission power of a pathloss estimation signal and an L3-RSRP value measured based on the received transmission power are required. In FIG. 8, an entity for transmitting a pathloss estimation signal is a TX UE and an entity for measuring L3-RSRP is an RX UE. The TX UE performing transmission power control may be aware of the transmission power of the pathloss estimation signal transmitted by the TX UE, but may not be aware of an L3-RSRP value measured by the RX UE. Thus, as shown in FIG. 8, the RX UE may have to report L1-RSRP or L3-RSRP to the TX UE. The PSFCH is a feedback channel transmitted from the RX UE to the TX UE, and an entity for performing transmission power control may be the RX UE. The RX UE may measure L3-RSRP through the pathloss estimation signal transmitted by the TX UE, such that for SL pathloss estimation, the TX UE needs to be aware of the transmission power value of the pathloss estimation signal transmitted by the TX UE. To this end, the TX UE may inform the RX UEs of the transmission power value used by the TX UE for transmission of the pathloss estimation signal. There may be various informing methods, and for example, the TX UE may transmit the transmission power in the SCI through the PSCCH. In another example, the TX UE may transmit the transmission power in MAC-CE or PC-5 RRC information through the PSSCH.

In another example of PSFCH transmission power control based on an SL pathloss estimation value, one of the methods described with reference to FIGS. 9 and 10 may be used. That is, the roles of the TX UE and the RX UE may be changed in groupcast communication, such that the UE performing the role of the TX UE may store an SL pathloss value in the memory. When the TX UE has to change the role into the RX UE and perform PSFCH transmission, the RX UE (i.e., a previous TX UE) may perform PSFCH transmission power control by using the stored SL pathloss value.

Method 2) Transmission Power Control Using a Mapping Relationship Between RSRP Measured by RX UE and PSFCH Transmission Power For the TX UE and the RX UEs performing group communication in the same group, a mapping table such as [Table 1] may be configured through the base station or PC-5 RRC. Alternatively, the configuration information may be preconfigured. Such configuration information may also be included in resource pool configuration information. In [Table 1], the RSRP measured in the RX UE may be L1-RSRP or L3-RSRP.

TABLE 1

Mapping Table between RSRP measured by RX UE and PSFCH transmitted by RX UE

| Index | RSRP MEASURED BY RX UE | PSFCH TRANSMISSION POWER OF RX UE |
|---|---|---|
| 0 | $X_1$ dB | $Y_1$ dBm |
| ... | ... | ... |
| k | $X_k$ dB | $Y_k$ dBm |

In another example, the base station may configure [Table 1] with groupcast TX UE and RX UE in its cell through system information or RRC setup The TX UE may be in an RRC-disconnected state (RRC idle state) with the base station, and the RX UE may be in an RRC-connected state (RRC connected state) with the base station. The RX UE may report its measured SL RSRP value to the base station, and the base station having received the SL RSRP value may transmit an index of [Table 1] to the RX UE through DCI based on the reported RSRP value.

In another example, the TX UE may be in the RRC-connected state with the base station, and the RX UE may be in the RRC-disconnected state with the base station. In this case, the TX UE may report its measured RSRP value or its estimated SL pathloss value to the base station. The base station having received the report may transmit the index of [Table 1] to the TX UE through the DCI based on the reported RSRP value or the reported SL pathloss value. The TX UE having received the index may transmit the index through SCI transmitted to the RX UE.

Method 3) PSFCH Transmission Power Control Based on DL Pathloss Value

The RX UE may control PSFCH transmission power based on a DL pathloss value with the base station, without estimating an SL pathloss. In this case, it is possible to modify min{Q0, Q1}=Q0 in [Equation 7], which may be expressed like [Equation 8].

$$P_{PSFCH}(i) = \min\{Pcmax(i), P_{Congestion}, P_{Range}, 10\log_{10}(M_{PSFCH} * 2^\mu) + P_{0\_PSFCH\_DL} + \alpha_{PSFCH\_DL} * PL_{DL}(q)\}[dBm]$$

Equation 8

As described with reference to FIGS. 7A and 7B, when $P_{Congestion}$ and $P_{Range}$ are not configured in [Equation 8], they may be omitted. In Method 3), when the RX UE exists out of the coverage of the base station, [Equation 8] may not be applied because the RX UE may not be able to estimate a DL pathloss value. When the RX UE that has to transmit the PSFCH is located near the base station, the DL pathloss value is small, such that the coverage of the PSFCH may be reduced when Method 3) is applied. Thus, when the TX UE that has to receive the PSFCH is located far away from the base station (i.e., located in a cell edge), the TX UE may not receive the PSFCH.

Method 4) PSFCH Transmission Power Control Ignoring Pathloss Value

As mentioned in Method 3), when the RX UE transmitting the PSFCH exists out of the coverage of the base station, the RX UE may not estimate the DL pathloss value. Likewise, a case where the SL pathloss value may not be estimated (i.e., a case where Method 1) is not applicable) may exist. For example, when the RX UE has to transmit the PSFCH before the roles of the TX UE and the RX UE are changed in groupcast communication, there may be no SL pathloss value stored by the RX UE in the memory. To solve such problems, Method 4) may be considered. More specifically, when a DL pathloss value is not applicable in Method 3), the RX UE transmitting the PSFCH may apply $\alpha_{PSFCH\_DL}=0$ in [Equation 8]. Similarly, when an SL pathloss value is not applicable, the RX UE transmitting the PSFCH may apply $\alpha_{PSFCH\_SL}=0$ in [Equation 7]. To expand this, when none of the DL pathloss value and the SL pathloss value is applicable, the RX UE transmitting the PSFCH may apply $\alpha_{PSFCH\_DL}=0$ and $\alpha_{PSFCH\_SL}=0$ in [Equation 7].

In the foregoing example, it is described that the RX UE determines whether to apply $\alpha_{PSFCH\_DL}=0$ and $\alpha_{PSFCH\_SL}=0$, whether to apply $_{PSFCH\_DL}=0$, or whether to apply $\alpha_{PSFCH\_SL}=0$ in PSFCH transmission. However, in another example, the UE may apply a corresponding value based on a configuration of the base station, a PC-5 RRC configuration, or a pre-configuration. More specifically, when the RX UE exists out of the coverage of the base station, a resource pool used by the RX UE in SL transmission may be preconfigured. In this case, $\alpha_{PSFCH\_DL}=0$ may be preconfigured, and this information may be included in preconfigured resource pool information.

Method 5) Use of Configured PSFCH Transmission Power Value

As mentioned before, in PSFCH transmission of the RX UE, one of a DL pathloss value and an SL pathloss value may be difficult to apply or both of them may be difficult to apply. Thus, like in Method 4), a preconfigured value may be used as a PSFCH transmission power. However, a difference between Method 4) and Method 5) is that in Method 4), $\alpha_{PSFCH\_DL}$ or $\alpha_{PSFCH\_SL}$ is configured according to whether a pathloss value is applied or not. The configured $\alpha_{PSFCH\_DL}$ or $\alpha_{PSFCH\_SL}$ is applied to [Equation 7] to configure the transmission power value of the PSFCH. However, in Method 5), the PSFCH transmission power is configured, such that $P_{PSFCH}$ is configured instead of use of [Equation 7] in configuring of the PSFCH transmission power. In this case, $P_{PSFCH}$ may use system information and RRC of the base station or PC-5 RRC, or may be preconfigured. The RX UE may configure $P_{PSFCH}$ to the PSFCH transmission power and transmit the PSFCH.

Method 6) PSFCH Transmission Power Control Based on Congestion Level or Range Information As described with reference to FIGS. 7A and 7B, the V2X UE may obtain $P_{Congestion}$ or $P_{Range}$ based on system information or RRC of the base station or PC-5 RRC or the RX UE may obtain the same based on a pre-configuration. The RX UE transmitting the PSFCH may configure $P_{PSFCH}=P_{Congestion}$ when $P_{Congestion}$ is set. The RX UE may configure $P_{PSFCH}=P_{Range}$ when $P_{Range}$ is set. When both $P_{Congestion}$ and $P_{Range}$ are configured for the RX UE, $P_{PSFCH}=\min\{P_{Congestion}, P_{Range}\}$. In another example, when the configured transmission power value is greater than a maximum transmission power of the UE, the PSFCH transmission power may be configured using $P_{PSFCH}=\min\{Pcmax, P_{Congestion}\}$, $P_{PSFCH}=\min\{Pcmax, P_{Range}\}$, or $P_{PSFCH}=\min\{Pcmax, P_{Congestion}, P_{Range}\}$.

Method 7) PSFCH Transmission Power Control Based on Distance

As mentioned above, when the quality of a particular link is very low in groupcast communication including a plurality of SLs, the performance of groupcast communication may degrade due to the link. For example, it may be assumed that 10 UEs perform groupcast communication (i.e., one UE is a TX UE, and nine UEs are RX UEs), one UE (RX UE-1) among nine RX UEs is located far away from the TX UE, and the other eight RX UEs (RX UE-2, RX UE-3, . . . , RX UE-9) are located near the TX UE.

When an HARQ operation of transmitting ACK and NACK is used in groupcast communication, the RX UE-1 located far away from the TX UE may fail decoding of the PSSCH transmitted by the TX UE and transmit the NACK or may not receive the PSSCH transmitted by the TX UE. However, the RX UEs (RX UE-2, RX UE-3, . . . , RX UE-9) located near the TX UE may succeed in decoding of the PSSCH transmitted by the TX UE and transmit ACK. The TX UE may receive NACK from the RX UE-1 or fail to receive ACK/NACK feedback information, and thus needs to perform retransmission. The RX UE-2, the RX UE-3, . .

, the RX UE-9 succeed in decoding of the PSSCH and thus may receive new data due to the RX UE-1 even when they are capable of receiving the new data. When the HARQ operation of transmitting NACK in groupcast communication is used, a problem may occur which is similar to a problem occurring when the HARQ operation of transmitting both ACK and NACK is used.

In addition to the above-described problems, an automatic gain control (AGC) range setting problem for receiving a signal in the reception end may also occur. That is, the TX UE has to receive the PSFCH from the RX UEs existing in different positions, and in this case, the PSFCH transmitted by the UE located far away from the TX UE like the RX UE-1 may leave the range of the AGC configured by the TX UE. In this case, the signal of the PSFCH received by the TX UE may be distorted and thus reception of the PSFCH may be impossible. Alternatively, the TX UE may have to configure the range of the AGC unnecessarily large due to reception of the PSFCH transmitted from the RX UE-1. In this case, the granularity of the AGC increases, degrading the performance of the received PSFCH.

To solve the above-described problems, threshold value-based PSFCH transmission (in light of the RX UE transmitting the PSFCH) or threshold value-based PSFCH reception (in light of the TX UE receiving the PSFCH) may be considered. More specifically, PSFCH transmission based on RSRPs or PSFCH transmission based on a distance between the TX UE and the RX UE may be considered.

For PSFCH transmission/reception based on RSRP between the TX UE and the RX UE, the RX UE may measure RSRP (L1-RSRP or L3-RSRP) through a signal transmitted from the TX UE and compare the measured RSRP with an RSRP threshold value. When the measured RSRP is less than or less than or equal to the RSRP threshold value, the RX UE may not transmit the PSFCH to the TX UE (i.e., may not perform HARQ feedback). In this way, in the example, problems occurring in the RX UE-1 located far away from the TX UE may be solved. In this case, the RSRP threshold value may be configured through system information and RRC of the base station or PC-5 RRC, or may be preconfigured. In another example, the TX UE may transmit the RSRP threshold value to the RX UE through SCI. However, due to random characteristics of a channel such as RSRP-based fading and shadowing, the RSRP may not be converted directly to a distance. For example, the RX UE-1 may measure the RSRP value to which fading and shadowing of a positive value are reflected due to a temporary phenomenon. In this case, the RX UE-1 may be determined to be located near the TX UE due to RSRP measurement although the RX UE-1 is actually located far away from the TX UE. As a result, the RX UE-1 has to transmit the PSFCH to the TX UE, and the TX UE has to configure an AGC range for receiving the PSFCH. Thus, RSRP-based PSFCH transmission may not be able to solve the aforementioned problem.

For distance-based PSFCH transmission of the RX UE, the RX UE has to be aware of distance information between the RX UE and the TX UE, which may be identified by the RX UE based on location information of the RX UE and location information of the TX UE. The location information of the RX UE may be coordinate information of the RX UE or zone information to which the RX UE belongs, and the location information of the TX UE may be coordinate information of the TX UE or zone information to which the TX UE belongs. The zone information to which the UE belongs may be identified from mapping information between a zone and coordinates included in coordinate information and configuration information of the UE.

In the V2X system, a method in which the UE identifies location information thereof may be various. For example, the UE may obtain location information thereof based on a GNSS or a GPS. The UE may obtain its location information based on the zone information. To identify a relationship between the zone information and the location information, mapping information between the zone and the location may be provided. The zone information may be stored in the UE, and the zone information may be received from the base station. The zone information received from the base station may include information about the mapping relationship between the zone and the location information. The UE may obtain its location information based on location information of a macro cell or a small cell. However, a method for the UE to obtain its location information is not limited thereto, and the UE may obtain its location information in various ways.

The TX UE may identify its location information through at least one of the above-described methods. The RX UE may identify its location information through at least one of the above-described methods, and provide the location information to the TX UE. The TX UE may identify the location information of the TX UE based on the information received from the TX UE, and the TX UE may transmit its location information through the PSCCH or the PSSCH. When the location information is transmitted through the PSCCH, a field for location information may be included in a particular SCI format. Whether the location information is included in the SCI format may be previously indicated to the TX UE. For example, in system information and RRC setup information of the base station or PC-5 RRC setup information (or preconfigured information), information indicating whether the location information is included in the SCI format or information for enabling or disabling inclusion of the location information may be included. When the location information is transmitted through the PSSCH, the location information may be included in the MAC CE or data. When the location information is included in the MAC CE, inclusion of the location information or related information may be indicated using a logical channel identify (LCID). A MAC subheader of the MAC CE may include the LCID. The LCID may include 6-bit information, and may indicate a type of the MAC CE or information included in the MAC CE. Thus, whether the MAC CE includes location information may be indicated through LCID. Whether the location information is included in the PSSCH may be previously indicated to the TX UE. For example, in system information and RRC setup information of the base station or PC-5 RRC configuration (or preconfigured information), information indicating whether the location information is included in the PSSCH or information for enabling or disabling inclusion of the location information may be included.

The RX UE having obtained distance information by using the above-described methods may determine whether to transmit the PSFCH based on a threshold value transmitted by the TX UE through the PSCCH or the PSSCH. That is, when the HARQ operation of transmitting ACK information and NACK information is used in groupcast communication, the RX UE may not transmit ACK or NACK information through the PSFCH when a distance measured by the RX UE from the TX UE is greater than or greater than or equal to the threshold value. Otherwise, according to a decoding result of the PSSCH, the RX UE may transmit ACK or NACK information to the TX UE through the PSFCH. Meanwhile, when the HARQ operation of transmitting NACK information is used in groupcast communication, the RX UE may not transmit ACK or NACK information through the PSFCH when a distance measured by the RX UE from the TX UE is greater than or greater than or equal to the threshold value. Otherwise, the RX UE may transmit NACK information to the TX UE through the PSFCH in case of a failure in decoding of the PSSCH. In the above-described examples, the threshold value may be a threshold value corresponding to a distance or a threshold value for a parameter corresponding thereto. That is, when the location information of the RX UE and the location information of the TX UE indicate the location of the RX UE and the location of the TX UE, the threshold value may be a threshold value for the distance between the RX UE and the TX UE. When the location information of the RX UE and the location information of the TX UE mean information about the zone of the RX UE and information about the zone of the TX UE, respectively, the threshold value may be a threshold value for a difference between the zones.

By using the above-described methods, the RX UE having obtained the distance between the RX UE and the TX UE or corresponding information may perform PSFCH transmission power control based on the obtained information. More specifically, the RX UE may estimate the SL pathloss by using the distance between the RX UE having obtained the information and the TX UE (or corresponding information). For example, as shown in [Table 2], there may be a mapping relationship between the distance between the RX UE and the TX UE (or corresponding information) and a pathloss value.

TABLE 2

Mapping table between distance between RX UE and TX UE and SL pathloss value

| Index | DISTANCE BETWEEN RX UE AND 1 | SL PATHLOSS |
|---|---|---|
| 0 | $X_1$ m | $Y_1$ dBm |
| ... | ... | ... |
| k | $X_k$ m | $Y_k$ dBm |

For the TX UE and the RX UEs performing group communication in the same group, a mapping table such as [Table 2] may be configured through the base station or PC-5 RRC. Alternatively, the configuration information may be preconfigured. Such configuration information may also be included in resource pool configuration information. The RX UE may obtain an SL pathloss value through [Table 2], and substitute the obtained SL pathloss value to [Equation 7], thus setting a transmission power value of the PSFCH.

In another example, as shown in [Table 3], there may be a mapping relationship between the distance between the RX UE and the TX UE (or corresponding information) and a PSFCH transmission power.

TABLE 3

Mapping table between distance between RX UE and TX UE and PSFCH transmission power

| Index | DISTANCE BETWEEN RX UE AND TX UE | PSFCH TRANSMISSION POWER |
|---|---|---|
| 0 | $X_1$ m | $Y_1$ dBm |
| ... | ... | ... |
| k | $X_k$ m | $Y_k$ dBm |

For the TX UE and the RX UEs performing group communication in the same group, a mapping table such as [Table 3] may be configured through the base station or PC-5 RRC. Alternatively, the configuration information may be preconfigured. Such configuration information may also be included in resource pool configuration information. The RX UE may configure the transmission power value of the PSFCH through [Table 3]. Alternatively, when the transmission power value of the PSFCH obtained through [Table 3] is defined as $P_{PSFCH0}$, the RX UE may configure the transmission power value of the PSFCH based on $P_{PSFCH}=\min\{Pcmax, P_{PSFCH0}\}$.

In another example, as described with reference to FIGS. 7A and 7B, the V2X UE may obtain $P_{Congestion}$ or $P_{Range}$ based on system information or RRC of the base station or PC-5 RRC or the RX UE may obtain the same based on a preconfiguration. When $P_{Congestion}$ is configured for the RX UE transmitting the PSFCH, $P_{PSFCH}=\min\{Pcmax, P_{PSFCH0}, P_{Congestion}\}$ may be configured. When $P_{Range}$ is configured for the RX UE, $P_{PSFCH}=\min\{Pcmax, P_{PSFCH0}, P_{Congestion}\}$ may be set. When both of them are configured for the RX UE, the transmission power value of the PSFCH may be configured to $P_{PSFCH}=\min\{Pcmax, P_{PSFCH0}, P_{Congestion}, P_{Range}\}$.

Meanwhile, reception of the PSCCH and the PSSCH in groupcast communication may be performed in a plurality of UEs in a group. However, a UE receiving the PSFCH transmitted from each RX UE in groupcast communication is one TX UE, such that transmission and reception of the PSFCH may be similar with unicast communication. Thus, while the methods for controlling the transmission power of the PSFCH have been described as being applied to groupcast communication, they may also be applied to unicast communication.

In addition, Method 7) is described as being applied to setting of the transmission power value of the PSFCH, but it may also be applied to setting of the transmission power value of the PSCCH or the PSSCH. For example, in SL groupcast communication, the roles of the TX UE and the RX UE in the same group may be changed. Thus, an operation in which the TX UE (UE-1) transmits distance information (or corresponding information) to the RX UE (UE-2) may be regarded as an operation where UE-2 (a previous RX UE and a current TX UE) transmits distance information (or corresponding information) to UE-1 (a previous TX UE, a current RX UE) after the role of the TX UE and the role of the RX UE are exchanged with each other. Thus, in SL groupcast communication, V2X UEs in the same group may share their location information (or corresponding information) with each other. In this case, [Table 2] and [Table 3] of Method 7) may be applied to setting of the transmission power value of the PSCCH or the PSSCH. However, the PSFCH transmission power value of [Table 3] may be substituted by the PSCCH transmission power value or the PSSCH transmission power value. That is, when [Table 3] is applied to setting of the transmission power value of the PSCCH, the transmission power value of the PSCCH, instead of the transmission power value of the PSFCH, may be included in the system information of the base station and the PC-5 RRC setup information. When a distance-based transmission power setting method of Method 7) is applied to all of the PSCCH, the PSSCH, and the PSFCH, each of the PSCCH transmission power value, the PSSCH transmission power value, and the PSFCH transmission value mapped to the distance between the TX UE and the RX UE may be configured (i.e., three tables configured). Alternatively, the transmission power value mapped to the distance between the TX UE and the RX UE may be applied in common, regardless of the PSCCH, the PSSCH, or the PSFCH.

Some methods described in the disclosure may be applied to groupcast communication or unicast communication. In addition, some methods described in the disclosure may be applied to both groupcast communication and unicast communication, but may not be applied to broadcast communication. Thus, the TX UE and the RX UE may use a method applicable to groupcast communication for groupcast communication, and may use a method applicable to unicast communication for unicast communication. Thus, a method for identifying unicast communication, groupcast communication, or broadcast communication may be required for the TX UE and the RX UE, which may be achieved by one of the following methods:

Method 1) Identification Through Independent Resource Pool Configuration

For the V2X UEs, a plurality of resource pools may be configured through the base station or PC-5 RRC or a preconfigured resource pool may be used. In this case, for unicast, groupcast, and broadcast communication, an independent resource pool may be configured. The V2X UEs may transmit and receive unicast, groupcast, and broadcast control information and data information they are to transmit in a resource pool through an indicator included in the configured resource pool information (e.g., an indicator indicating each of unicast, groupcast, or broadcast). That is, UEs performing unicast communication may perform SL transmission and reception in a unicast-dedicated resource pool, and UEs performing groupcast communication may perform SL transmission and reception in a groupcast dedicated resource pool. When one UE performs unicast communication and groupcast communication (i.e., UE-1 and UE-2 perform unicast communication, and UE-1 performs groupcast communication with UE-3, UE-4, and UE-5), UE-1 may perform SL communication with UE-2 in the unicast-dedicated resource pool and perform SL communication with UE-3, UE-4, and UE-5 in the groupcast-dedicated resource pool. In this case, unicast communication and groupcast communication of UE-1 may be performed at the same time or in a time-multiplexing manner.

In another example, for V2X UEs, a resource pool in which the PSFCH exists and a resource pool in which the PSFCH does not exist may be configured. Alternatively, a corresponding resource pool may be configured. For example, a resource pool A is an HARQ-operation-enabled resource pool, and configuration information of the resource pool may include HARQ-operation-related parameters (a time domain resource of the PSFCH, a maximum retransmission count, etc.). When such parameters are included in the resource pool configuration information, the V2X UE may determine that PSFCH transmission and reception in the corresponding resource pool are possible. On the other hand, a resource pool B is an HARQ-operation-disabled resource pool, and configuration information of the resource pool may not include HARQ-operation-related parameters (a time domain resource of the PSFCH, a maximum retransmission count, etc.). When such parameters are not included in the resource pool configuration information, the V2X UE may determine that PSFCH transmission and reception in the corresponding resource pool are not possible.

In another example, a combination of the two examples (a case where an independent resource pool is configured according to unicast, groupcast, and broadcast and a case where different resource pools are configured according to whether PSFCH transmission and reception are possible).

That is, an independent resource pool may be configured according to unicast, groupcast, and broadcast and different resource pools may be configured according to whether PSFCH transmission and reception are possible.

In another example, for a unicast, groupcast, or broadcast V2X communication scheme, an identical resource pool may be configured. That is, at least two V2X communication schemes may coexist in the allocated resource pool. For example, the resource pool A may be shared among the V2X TX and RX UEs using unicast communication and groupcast communication, and the resource pool B may be shared among the V2X TX UEs using groupcast communication and broadcast communication. The resource pool C may be shared among the V2X TX and RX UEs using groupcast communication and broadcast communication.

Method 2) Identification Through Field Explicitly Indicated in Resource Pool Configuration Information Unlike in Method 1), in Method 2), at least two of the unicast communication scheme, the groupcast communication scheme, or the broadcast communication scheme may coexist in the allocated resource pool. For example, the resource pool A may be shared among the V2X TX and RX UEs using unicast communication and groupcast communication, and the resource pool B may be shared among the V2X TX UEs using groupcast communication and broadcast communication. The resource pool C may be shared among the V2X TX and RX UEs using groupcast communication and broadcast communication. More specifically, the system information and the RRC configuration information of the base station or the PC-5 RRC configuration information (or preconfiguration information) for the resource pool A may be as below. Unicast={parameter a1, parameter a2, . . . , parameter aN}, Groupcast={parameter a1, parameter a2, . . . , parameter aN} In this case, the parameter a1 applied to unicast communication and the parameter a1 applied to groupcast communication may be the same as each other, but may be different from each other. The parameter a2 applied to unicast communication and the parameter a2 applied to groupcast communication may be the same as each other, but may be different from each other. Likewise, the parameter aN applied to unicast communication and the parameter aN applied to groupcast communication may be the same as each other, but may be different from each other. In the above example, the number of parameters configured for unicast communication and the number of parameters configured for groupcast communication are equal to N, but may be different from each other.

Method 3) Identification Based on Different DCI Formats or DCI Fields

For mode 1 resource allocation illustrated in FIGS. 2A and 2B, the TX UE may request the base station to provide a resource for SL data to be transmitted by the base station and may be allocated with a transmission resource through DCI from the base station. When the TX UE requests a resource, the resource may information about whether the resource is for unicast communication, groupcast communication, or broadcast communication (a V2X communication type). The corresponding information may be transmitted through RRC, A MAC-CE, or a MAC PDU. The base station having received the information may allocate a resource to the TX UE by using different DCI formats according to a V2X communication type requested by the TX UE. For example, a DCI format A may mean unicast, a DCI format B may mean groupcast, and a DCI format C may mean broadcast. In another example, although the same DCI format is used, an identifier for identifying unicast, groupcast, or broadcast may be included in a field of the DCI. An example of using different DCI formats and an example of using the same DCI format and different identifiers in the DCI may be used together. For example, unicast and groupcast may use the same DCI format (DCI format A), and may be identified through an identifier field in the DCI. However, broadcast may use a different DCI format (DCI format B).

Method 4) Identification Through Different SCI Formats or SCI Fields

Method 3) may be achieved in the TX UE using mode 1 resource allocation. The RX UE does not receive the DCI for receiving SL control information and data information from the base station, such that the RX UE may not identify unicast, groupcast, or broadcast through Method 3). In this case, the RX UE may not identify unicast and groupcast. Moreover, when the TX UE selects its transmission resource through mode 2 resource allocation out of a coverage of the base station, the TX UE may not receive the DCI from the base station and thus the TX UE may not identify unicast, groupcast, and broadcast through Method 3).

To solve the above-described problems, the TX UE may transmit the PSCCH by using different SCI formats. For example, an SCI format A may mean unicast, an SCI format B may mean groupcast, and an SCI format C may mean broadcast. In another example, although the same SCI format is used, an identifier for identifying unicast, groupcast, or broadcast may be included in a field of the SCI. An example of using different SCI formats and an example of using the same SCI format and different identifiers in the SCI may be used together. For example, unicast and groupcast may use the same SCI format (SCI format A), and may be identified through an identifier field in the SCI. However, broadcast may use a different SCI format (SCI format B).

Method 5) Identification Through Different $\{P_0(j), \alpha(j)\}$ $P_0$ and $\alpha$ used in [Equation 2], [Equation 3], [Equation 7], and [Equation 8] may have indices, respectively (e.g., an index 'j' for $\{P_0(j), \alpha(j)\}$). In this case, the index 'j' may mean unicast (j=0), groupcast (j=1), and broadcast (j=2). That is, the TX UE transmitting the PSCCH and the PSSCH through unicast communication may apply a parameter for $\{P_0(0), \alpha(0)\}$, and the TX UE transmitting the PSCCH and the PSSCH through groupcast communication may apply a parameter for $\{P_0(1), \alpha(1)\}$. In the foregoing example, $P_0(j)$ may mean $P_{0\_PSCCH\_SL}(j)$, $P_{0\_PSCCH\_DL}(j)$, $P_{0\_PSSCH\_SL}(j)$, $P_{0\_PSSCH\_DL}(j)$, $P_{0\_PSFCH\_SL}(j)$, or $P_{0\_PSFCH\_DL}(j)$. $\alpha(j)$ may mean $\alpha_{PSSCH\_SL}(j)$, $\alpha_{PSSCH\_DL}(j)$, $\alpha_{PSSCH\_SL}(j)$, $\alpha_{PSSCH\_DL}(j)$, $\alpha_{PSFCH\_SL}(j)$, or $\alpha_{PSFCH\_DL}(j)$.

By using at least one of the above-described methods, the TX UE or the RX UE may operate by identifying a V2X communication type of unicast, groupcast, or broadcast.

Figure 12:
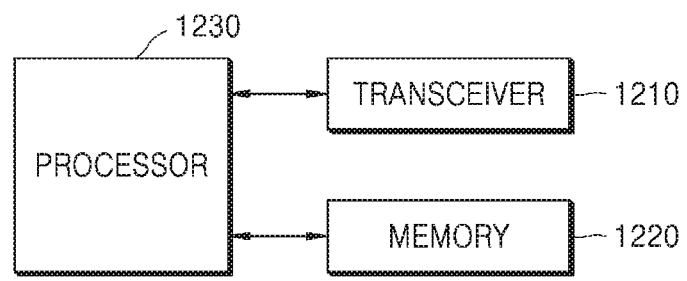
FIG. 12 is a block diagram illustrating a structure of a transmission terminal, according to an embodiment of the disclosure.

FIG. 12 is a block diagram illustrating a structure of a transmission terminal, according to an embodiment of the disclosure.

Referring to FIG. 12, a transmission UE according to the disclosure may include a transceiver 1210, a memory 1220, and a processor 1230. According to the above-described communication method of the base station, the processor 1230, the transceiver 1210, and the memory 1220 of the base station may operate. However, components of the transmission UE are not limited to the above-described example. For example, the transmission UE may include components that are more than or less than the above-described components. Moreover, the processor 1230, the transceiver 1210, and the memory 1220 may be implemented in a single chip form. The processor 1230 may also include at least one processor.

The transceiver 1210 may collectively refer to a receiver and a transmitter of the transmission UE and transmit and receive a signal to and from the base station. The signal transmitted and received to and from the base station may include control information and data. To this end, the transceiver 1210 may include an RF transmitter that up-converts and amplifies a frequency of a transmission signal and an RF signal that low-noise-amplifies a received signal and down-converts a frequency. However, this is merely an example of the transceiver 1210, components of which are not limited to the RF transmitter and the RF receiver.

The transceiver 1210 may receive a signal through a radio channel and output the received signal to the processor 1230, and transmit a signal output from the processor 1230 through the radio channel.

The memory 1220 may store programs and data required for an operation of the transmission UE. The memory 1220 may also store control information or data included in a signal obtained by the transmission UE. The memory 1220 may include a storage medium such as read only memory (ROM), random access memory (RAM), hard-disk, compact disc (CD)-ROM, digital versatile disc (DVD), etc., or a combination thereof.

The processor 1230 may control a series of processes such that the transmission UE operates according to the above-described embodiment of the disclosure. For example, the transceiver 1210 may receive a data signal including a control signal, and the processor 1230 may determine a reception result for the data signal.

Figure 13:
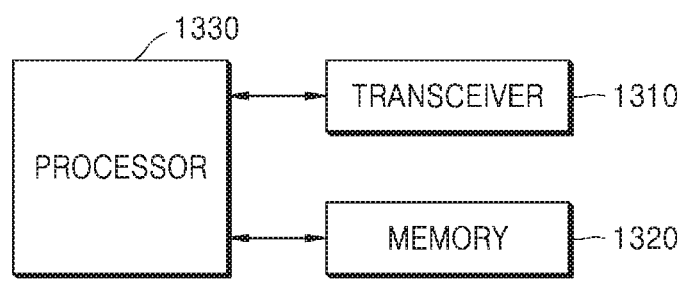
FIG. 13 is a block diagram illustrating a structure of a reception UE, according to an embodiment of the disclosure.

FIG. 13 is a block diagram illustrating a structure of a reception UE, according to an embodiment of the disclosure.

Referring to FIG. 13, the reception UE according to the disclosure may include a transceiver 1310, a memory 1320, and a processor 1330. According to the above-described communication method of the base station, the processor 1330, the transceiver 1310, and the memory 1320 of the reception UE may operate. However, components of the reception UE are not limited to the above-described example. For example, the reception UE may include components that are more than or less than the above-described components. Moreover, the processor 1330, the transceiver 1310, and the memory 1320 may be implemented in a single chip form. The processor 1330 may also include at least one processor.

The transceiver 1310 may collectively refer to a receiver and a transmitter of the reception UE and transmit and receive a signal to and from the base station. The signal transmitted and received to and from the base station may include control information and data. To this end, the transceiver 1310 may include an RF transmitter that up-converts and amplifies a frequency of a transmission signal and an RF signal that low-noise-amplifies a received signal and down-converts a frequency. However, this is merely an example of the transceiver 1310, components of which are not limited to the RF transmitter and the RF receiver.

The transceiver 1310 may receive a signal through a radio channel and output the received signal to the processor 1330, and transmit a signal output from the processor 1330 through the radio channel.

The memory 1320 may store programs and data required for an operation of the reception UE. The memory 1320 may also store control information or data included in a signal obtained by the reception UE. The memory 1320 may include a storage medium such as read only memory (ROM), random access memory (RAM), hard-disk, compact disc (CD)-ROM, digital versatile disc (DVD), etc., or a combination thereof.

The processor 1330 may control a series of processes such that the reception UE operates according to the above-described embodiment of the disclosure. For example, the transceiver 1310 may receive a data signal including a control signal, and the processor 1330 may determine a reception result for the data signal.

The methods according to the embodiments of the disclosure described in the claims or specification of the disclosure may be implemented by hardware, software, or a combination thereof.

When the methods are implemented by software, a computer-readable storage medium or a computer program product having stored therein one or more programs (software modules) may be provided. The one or more programs stored in the computer-readable storage medium or computer program product may be configured for execution by one or more processors in an electronic device. The one or more programs include instructions that cause the electronic device to execute the methods according to the embodiments described in the claims or the specification of the disclosure.

These programs (software modules and software) may be stored in RAMs, non-volatile memories including flash memories, ROMs, electrically erasable programmable ROMs (EEPROMs), magnetic disc storage devices, CD-ROMs, DVDs, other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

According to an embodiment of the disclosure, transmission parameters of SL control information and data information may be controlled based on a channel quality of an SL. In this way, in vehicle communication, a D2D system, etc., reliability and data rate of SL control information, data information, and feedback information may be improved. Moreover, the amount of interference caused to a nearby cell or vehicle and a nearby UE may be reduced. Thus, efficient communication between UEs may be supported. Moreover, a service may be effectively provided in a mobile communication system.

In the detailed embodiments of the disclosure, components included in the disclosure have been expressed as singular or plural according to the provided detailed embodiment of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

Meanwhile, the embodiments of the disclosure disclosed in the specification and drawings have been provided to easily describe the disclosure and to help with the understanding of the disclosure, and are not intended to limit the scope of the disclosure. In other words, it is apparent to one of ordinary skill in the art that various changes may be made thereto without departing from the scope of the disclosure. In addition, the embodiments of the disclosure may be used in combination when necessary. For example, an embodiment of the disclosure may be combined with some parts of another embodiment of the disclosure. In addition, other modifications based on the technical spirit of the above-described embodiment of the disclosure may also be carried out in other systems, e.g., an LTE system, a 5G system, an NR system, etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a vehicle-to-everything (V2X) user equipment (UE) in a wireless communication system, the method comprising:
    receiving, from a base station, one or more first parameters for sidelink pathloss based power control and one or more second parameters for downlink pathloss based power control;
    determining a transmission power for a physical sidelink shared channel (PSSCH) transmission, based on the one or more first parameters and the one or more second parameters; and
    performing the PSSCH transmission to a receiving V2X UE, based on the transmission power,
    wherein the transmission power includes:
        a first transmission power for a first PSSCH transmission in one or more first symbols where a physical sidelink control channel (PSCCH) is not transmitted, and
        a second transmission power for a second PSSCH transmission in one or more second symbols where the PSCCH is transmitted.

2. The method of claim 1, wherein the determining of the transmission power comprises:
    determining the first transmission power, based on a maximum transmission power of the V2X UE, a transmission power based on the sidelink pathloss, and a transmission power based on the downlink pathloss.

3. The method of claim 2, wherein the configuring determining of the transmission power further comprises:
    determining the second transmission power, based on a number of resource blocks for the PSCCH, a number of resource blocks in the one or more second symbols, and the first transmission power.

4. The method of claim 1, further comprising:
    determining a transmission power for the PSCCH, based on a ratio of a number of resource blocks for the PSCCH to a number of resource blocks in the one or more second symbols, and the first transmission power.

5. The method of claim 2, wherein the transmission power based on the sidelink pathloss is calculated, based on the one or more first parameters and a sidelink pathloss estimation.

6. The method of claim 2, wherein the transmission power based on the downlink pathloss is calculated, based on the one or more second parameters and a downlink pathloss estimation.

7. The method of claim 1,
    wherein the one or more first parameters include a parameter for compensating the sidelink pathloss, and
    wherein the one or more second parameters include a parameter for compensating the downlink pathloss.

8. The method of claim 1, further comprising:
    receiving, from the base station, information on a maximum transmission power which the V2X UE is usable according to a congestion level, wherein the determining of the transmission power comprises:
  determining the first transmission power, based on a maximum transmission power of the V2X UE, a transmission power based on the sidelink pathloss, a transmission power based on the downlink pathloss and the maximum transmission power which the V2X UE is usable according to the congestion level.

9. The method of claim 1, further comprising:
  receiving, from the receiving V2X UE via a physical sidelink feedback channel (PSFCH), feedback information corresponding to the PSSCH transmission, based on a transmission power for the PSFCH,
  wherein the transmission power for the PSFCH is determined, based on one or more parameters for downlink pathloss based power control for the PSFCH.

10. The method of claim 9, wherein the transmission power for the PSFCH is determined, based on a predetermined value, when the downlink pathloss is not applicable.

11. A vehicle-to-everything (V2X) user equipment (UE) in a wireless communication system, the V2X UE comprising:
  a transceiver; and
  at least one processor coupled with the transceiver and configured to:
    receive, from a base station, one or more first parameters for sidelink pathloss based power control and one or more second parameters for downlink pathloss based power control;
    determine a transmission power for a physical sidelink shared channel (PSSCH) transmission, based on the one or more first parameters and the one or more second parameters; and
    perform the PSSCH transmission to a receiving V2X UE, based on the transmission power,
  wherein the transmission power includes:
    a first transmission power for a first PSSCH transmission in one or more first symbols where a physical sidelink control channel (PSCCH) is not transmitted, and
    a second transmission power for a second PSSCH transmission in one or more second symbols where the PSCCH is transmitted.

12. The V2X UE of claim 11, wherein the at least one processor is further configured to:
  determine the first transmission power, based on a maximum transmission power of the V2X UE, a transmission power based on the sidelink pathloss and a transmission power based on the downlink pathloss.

13. The V2X UE of claim 12, wherein the at least one processor is further configured to:
  determine the second transmission power, based on a number of resource blocks for the PSCCH, a number of resource blocks in the one or more second symbols, and the first transmission power.

14. The V2X UE of claim 11, wherein the at least one processor is further configured to:
  determine a transmission for the PSCCH, based on a ratio of a number of resource blocks for the PSCCH to a number of resource blocks in the one or more second symbols, and the first transmission power.

15. The V2X UE of claim 12, wherein the transmission power based on the sidelink pathloss is calculated, based on the one or more first parameters and a sidelink pathloss estimation.

16. The V2X UE of claim 12, wherein the transmission power based on the downlink pathloss is calculated, based on the one or more second parameters and a downlink pathloss estimation.

17. The V2X UE of claim 11, wherein the
  one or more first parameters include a parameter for compensating the sidelink pathloss, and
  wherein the one or more second parameters include a parameter for compensating the downlink pathloss.

18. The V2X UE of claim 11, wherein the at least one processor is further configured to:
  receive, from the base station, information on a maximum transmission power which the V2X UE is usable according to a congestion level; and
  determine the first transmission power, based on a maximum transmission power of the V2X UE, a transmission power based on the sidelink pathloss, a transmission power based on downlink pathloss and the maximum transmission power which the V2X UE is usable according to the congestion level.

19. The V2X UE of claim 11, wherein the at least one processor is further configured to:
  receive, from the receiving V2X UE via a physical sidelink feedback channel (PSFCH), feedback information corresponding to the PSSCH transmission, based on a transmission power for the PSFCH,
  wherein the transmission power for the PSFCH is determined based on one or more parameters for downlink pathloss based power control for the PSFCH.

20. The V2X UE of claim 19, wherein
  the transmission power for the PSFCH is determined, based on a predetermined value, when the downlink pathloss is not applicable.

* * * * *